United States Patent
Samusik et al.

(10) Patent No.: US 12,306,087 B2
(45) Date of Patent: May 20, 2025

(54) METHOD FOR OPTIMAL SCALING OF CYTOMETRY DATA FOR MACHINE LEARNING ANALYSIS AND SYSTEMS FOR SAME

(71) Applicant: Becton, Dickinson and Company, Franklin Lakes, NJ (US)

(72) Inventors: Nikolay Samusik, Monterey, CA (US); Joseph T. Trotter, La Jolla, CA (US)

(73) Assignee: BECTON, DICKINSON AND COMPANY, Franklin Lakes, NJ (US)

(*) Notice: Subject to any disclaimer, the term of this patent is extended or adjusted under 35 U.S.C. 154(b) by 517 days.

(21) Appl. No.: 17/470,461

(22) Filed: Sep. 9, 2021

(65) Prior Publication Data
US 2022/0155209 A1    May 19, 2022

Related U.S. Application Data
(60) Provisional application No. 63/115,994, filed on Nov. 19, 2020.

(51) Int. Cl.
*G01N 15/1434* (2024.01)
*G01N 15/10* (2024.01)
*G01N 15/149* (2024.01)

(52) U.S. Cl.
CPC .... *G01N 15/1434* (2013.01); *G01N 2015/1006* (2013.01); *G01N 15/149* (2024.01)

(58) Field of Classification Search
CPC ............. G01N 15/1434; G01N 15/149; G01N 2015/1006; G01N 2015/1402; G01N 15/1459; G01N 15/1429
See application file for complete search history.

(56) References Cited

U.S. PATENT DOCUMENTS

2009/0091746 A1    4/2009 Fukuda et al.
2009/0204557 A1    8/2009 Zhang et al.
(Continued)

FOREIGN PATENT DOCUMENTS

| EP | 1785899 A2 | 5/2007 | |
|---|---|---|---|
| WO | WO-2007010236 A1 * | 1/2007 | ......... G01N 15/1429 |
| WO | WO-2022051753 A1 * | 3/2022 | ......... G01N 21/3577 |

OTHER PUBLICATIONS

Dhoble, et al. "Machine learning analysis of microbial flow cytometry data from nanoparticles, antibiotics and carbon sources perturbed anaerobic microbiomes", J Biol Eng.. Sep. 12, 2018;12:19.
(Continued)

*Primary Examiner* — Catherine T. Rastovski
*Assistant Examiner* — Yossef Korang-Beheshti
(74) *Attorney, Agent, or Firm* — Bret E. Field; BOZICEVIC, FIELD & FRANCIS LLP

(57) ABSTRACT

Aspects of the present disclosure include methods for processing and scaling cytometric data. Methods according to certain embodiments include obtaining cytometric data for a sample, wherein the cytometric data comprises measurements of a plurality of parameters from particles irradiated in the sample flowing in a flow stream; identifying a parameter of interest; specifying positive and negative measurement intervals on the parameter of interest; scaling the cytometric data by transforming the parameter of interest based at least in part on the corresponding specified positive and negative intervals. Systems for practicing the subject methods are also provided. Non-transitory computer readable storage mediums are also described.

14 Claims, 11 Drawing Sheets

(56) References Cited

U.S. PATENT DOCUMENTS

| | | | |
|---|---|---|---|
| 2010/0070502 A1* | 3/2010 | Zigon | G06F 18/231 |
| | | | 707/E17.002 |
| 2013/0150265 A1 | 6/2013 | Balog et al. | |
| 2016/0025621 A1* | 1/2016 | Kapinsky | G01N 21/255 |
| | | | 702/30 |
| 2019/0303760 A1 | 10/2019 | Kumar et al. | |
| 2021/0011006 A1* | 1/2021 | Aalipour | G01N 33/5047 |
| 2023/0401449 A1* | 12/2023 | Özel Duygan | G06F 18/24137 |

OTHER PUBLICATIONS

Li, et al. "Deep Cytometry: Deep learning with Real-time Inference in Cell Sorting and Flow Cytometry", Sci Rep Jul. 31, 2019;9(1):11088.

Moore, et al. "Update for the logicle data scale including operational code implementations", Cytometry A, vol. 81 A, No. 4, Mar. 12, 2012 (Mar. 12, 2012), pp. 273-277.

Parks, et al. "A new "Logicle" display method avoids deceptive effects of logarithmic scaling for low signals and compensated data", Cytometry A, Wiley-Liss, Hoboken, USA, No. 6, Apr. 7, 2006 (Apr. 7, 2006), pp. 541-551.

\* cited by examiner

METHOD FOR OPTIMAL SCALING OF CYTOMETRY DATA FOR MACHINE LEARNING ANALYSIS AND SYSTEMS FOR SAME

CROSS-REFERENCE

Pursuant to 35 U.S.C. § 119 (e), this application claims priority to the filing date of U.S. Provisional Patent Application Ser. No. 63/115,994 filed Nov. 19, 2020; the disclosures of which applications are incorporated herein by reference in their entirety.

INTRODUCTION

Flow-type particle detection and analysis systems, such as flow cytometers, are used to detect, analyze and, in some cases, sort particles in a fluid sample based on at least one measured characteristic of the particles. Visualization of data obtained from flow-type particle detection and analysis systems is an important part of the analysis and characterization of collected data and finds use in, for example, biological and medical research.

Analysis of data obtained from flow-type particle detection systems may entail visualization of data, such as the display of plots of data, obtained from several different detector channels of the particle detection system where one or more parameters displayed on the plot has been scaled. Analysis of data, such as analysis of visual representations of data, with one or more scaled parameters finds use in facilitating the understanding and characterization of particles exposed to the particle detection system as well as, importantly, understanding and characterizing populations, or clusters, of particles.

Analysis of cytometric data with one or more scaled parameters can play an important role in understanding populations of data by helping to distinguish between signal, indicating similarity or difference between particles, such as cell types, and noise resulting from, for example, measurement or instrument error. The role of scaling parameters in distinguishing between signal and noise is even more pronounced when the cytometric data is high dimensionality data because high dimensionality data provides additional opportunities for noise to affect how particles are clustered together. Appropriate scaling of cytometric data, especially high dimensionality data, can improve signal to noise characteristics in the analysis by mitigating or compressing, noise in the cytometric data.

SUMMARY

Embodiments of the present invention introduce novel techniques for scaling cytometric data more effectively, in terms of improving signal to noise ratios of the cytometric data, in particular with respect to high dimensionality cytometric data, thereby improving the usefulness of flow-type particle detection and analysis systems.

Aspects of the present disclosure include methods for scaling cytometric data. Methods according to certain embodiments comprise obtaining cytometric data for a sample, wherein the cytometric data comprises measurements of a plurality of parameters from particles irradiated in the sample flowing in a flow stream; identifying a parameter of interest; specifying positive and negative measurement intervals on the parameter of interest; and scaling the cytometric data by transforming the parameter of interest based at least in part on the corresponding specified positive and negative intervals.

In some embodiments, transforming the parameter of interest comprises rescaling the specified negative measurement interval for the parameter of interest. In such embodiments, rescaling the specified negative measurement interval for the parameter of interest may comprise reducing the standard deviation of the specified negative measurement interval for the parameter of interest. In other embodiments, transforming the parameter of interest further comprises rescaling the specified positive measurement interval for the parameter of interest. In such embodiments rescaling the specified positive measurement interval may comprise rescaling the positive measurement interval to a predetermined size. In some cases, the predetermined size is the size of a scaled positive measurement interval corresponding to a second parameter of the plurality of parameters.

In embodiments of the subject methods, transforming the parameter of interest comprises adaptively scaling the parameter of interest according to:

$$s(x) = \frac{g(z(x))}{g(z(p))}(1 + (c-1)\Phi_{z(n^+),1}(z(x))),$$

where, $s(x)$ represents the adaptively scaled measurements of the parameter of interest; $x$ represents unscaled measurements of the parameter of interest; $(n^-, n^+)$ is the specified negative measurement interval of the parameter of interest; $(n^+, p)$ is the specified positive measurement interval of the parameter of interest; $c$ is a compression factor; $\overline{X}$ is the median of the negative measurement interval; SD is the standard deviation of the negative measurement interval and is calculated according to $$SD = \frac{IQR}{1.36},$$

where IQR is the interquartile range of the negative measurement interval; $z(x)$ is a z-transform according to:

$$z(x) = \frac{x - \overline{X}}{SD}; g(z)$$

is an inverse hyperbolic sine function according to: $g(z) = \ln(z + \sqrt{z^{2+1}})$; and $\Phi_{z(n^+),1}$ is a cumulative distribution function of standard normal distribution with $\mu=z(n^+)$ and $\sigma=1$. In such embodiments, a default value of the compression factor, $c$, may be 70.

In embodiments, the subject methods further comprise displaying the scaled cytometric data. In some cases, displaying the scaled cytometric data comprises displaying a plot of cytometric data comprising the transformed parameter of interest.

In some embodiments, specifying at least one of the positive and negative measurement intervals on the parameter of interest comprises performing one-dimensional gating to specify the intervals. In other embodiments, specifying at least one of the positive and negative measurement intervals on the parameter of interest comprises applying a fluorescence minus one control to specify the intervals. In still other embodiments, specifying at least one of the positive and negative measurement intervals on the parameter of interest comprises applying a mathematical model to specify the intervals. In cases, specifying one or both of the positive and negative measurement intervals on the parameter of interest comprises applying a machine learning algorithm to specify the intervals.

Embodiments of the subject methods may further comprise: identifying one or more additional parameters of interest; specifying positive and negative measurement intervals on each additional parameter of interest; and scaling the cytometric data by transforming each additional parameter of interest based at least in part on the corresponding specified positive and negative intervals. In such embodiments, the specified positive measurement interval for each parameter of interest may be rescaled to the same predetermined size.

Other embodiments of the subject methods may further comprise clustering the cytometric data by applying a clustering algorithm to the scaled cytometric data. In such embodiments, displaying the scaled cytometric data may comprise displaying the clusters of the scaled cytometric data.

In some embodiments, the scaled cytometric data is used to improve the performance of a clustering algorithm applied to the cytometric data. In other embodiments, the scaled cytometric data is used to reduce the effect of measurement noise.

In some instances, the particles are cells. In such instances, the scaled cytometric data may be used to distinguish between two similar populations of cells.

In embodiments of the subject methods, the cytometric data is high dimensionality data. In such embodiments, the plurality of measurement parameters ranges from two to about 300,000 measurement parameters.

Systems for practicing the subject methods are also provided. Systems according to certain embodiments comprise an apparatus configured to obtain cytometric data comprising measurements of a plurality of parameters from particles irradiated in the sample flowing in a flow stream; a processor comprising memory operably coupled to the processor, wherein the memory comprises instructions stored thereon, which, when executed by the processor, cause the processor to: identify a parameter of interest; specify positive and negative measurement intervals on the parameter of interest; and scale the cytometric data by transforming the parameter of interest based at least in part on the corresponding specified positive and negative intervals.

In embodiments of the subject systems, the system is configured to cause the scaled cytometric data to be displayed on a display device. In such embodiments, the system is configured to cause the scaled cytometric data to be displayed on a display device by causing the display of a plot of cytometric data comprising the transformed parameter of interest. In some embodiments, the system is configured to identify one or more additional parameters of interest; specify positive and negative measurement intervals on each additional parameter of interest; and scale the cytometric data by transforming each additional parameter of interest based at least in part on the corresponding specified positive and negative intervals. In some embodiments, the system is configured to cluster the cytometric data by applying a clustering algorithm to the scaled cytometric data. In other embodiments, the system is configured to cause the display of the clusters of the scaled cytometric data. In still other embodiments, the cytometric data for a sample comprises measurements obtained from a flow cytometer configured to analyze the sample.

Non-transitory computer readable storage mediums are also described. Non-transitory computer readable storage mediums according to certain embodiments include instructions stored thereon having algorithm for obtaining cytometric data comprising measurements of a plurality of parameters from particles irradiated in the sample flowing in a flow stream; algorithm for identifying a parameter of interest; algorithm for specifying positive and negative measurement intervals on the parameter of interest; and algorithm for scaling the cytometric data by transforming the parameter of interest based at least in part on the corresponding specified positive and negative intervals.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
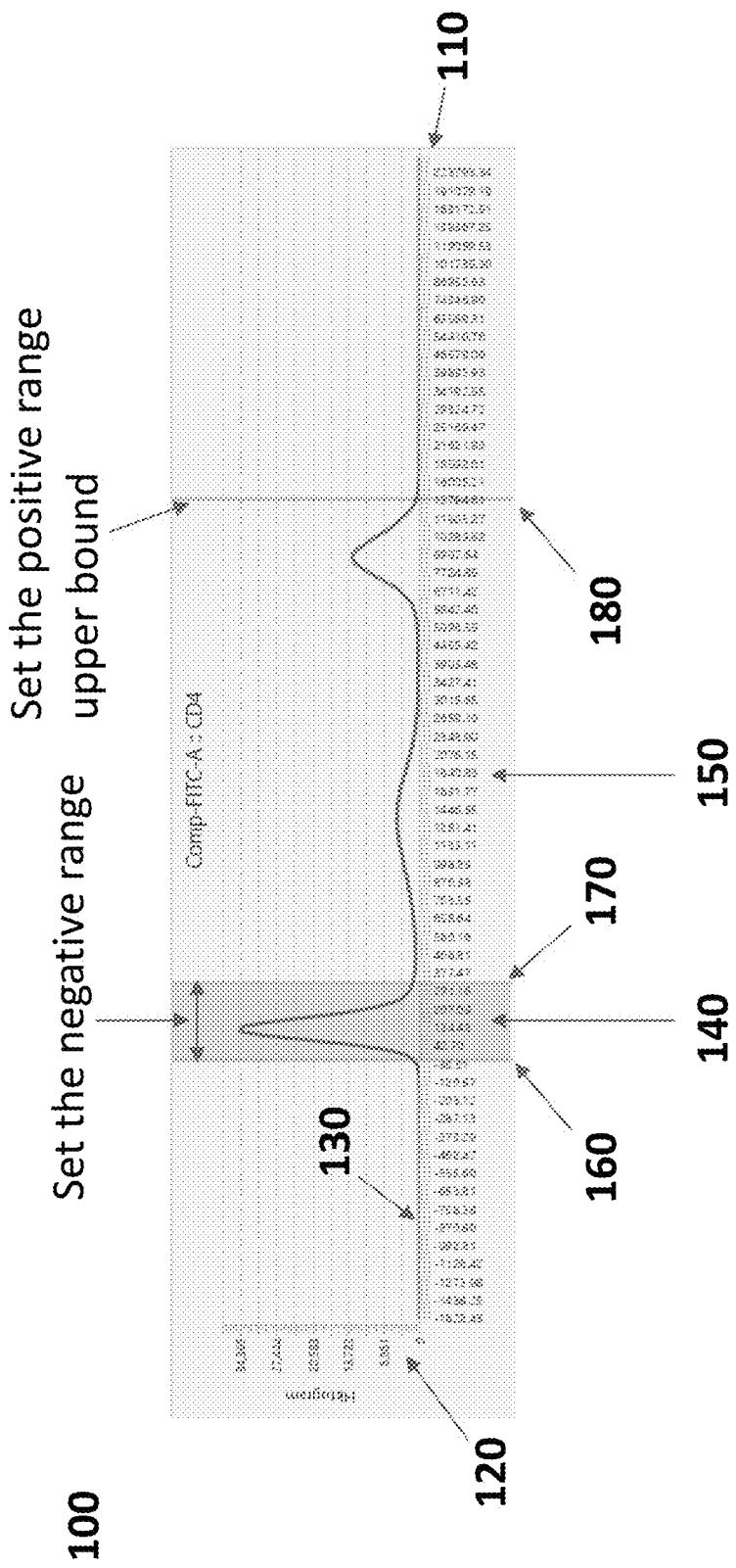
FIG. 1 depicts a display of an exemplary histogram of measurements of a parameter of interest of the cytometric data according to embodiments of the present invention.

Aspects of the present disclosure include methods of scaling cytometric data. In embodiments, methods include obtaining cytometric data for a sample, wherein the cytometric data comprises measurements of a plurality of parameters from particles irradiated in the sample flowing in a flow stream; identifying a parameter of interest; specifying positive and negative measurement intervals on the parameter of interest; and scaling the cytometric data by transforming the parameter of interest based at least in part on the corresponding specified positive and negative intervals. In other instances, methods include rescaling the specified negative measurement interval for the parameter of interest. In still other instances, methods include rescaling the specified positive measurement interval for the parameter of interest. Where desired, methods also include clustering the cytometric data by applying a clustering algorithm to the scaled cytometric data. Systems for practicing the subject methods are also provided. Non-transitory computer readable storage mediums are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for scaling cytometric data. In further describing embodiments of the disclosure, methods that include rescaling the specified negative measurement interval for the parameter of interest, rescaling the specified positive measurement interval for the parameter of interest and clustering the cytometric data by applying a clustering algorithm to the scaled cytometric data, are first described in greater detail. Next, systems to practice the subject methods are described. Non-transitory computer readable storage mediums are also described.

Methods for Scaling Cytometric Data

Aspects of the present disclosure include methods for scaling cytometric data. In particular, the present disclosure includes methods for obtaining cytometric data for a sample, wherein the cytometric data comprises measurements of a plurality of parameters from particles irradiated in the sample flowing in a flow stream; identifying a parameter of interest; specifying positive and negative measurement intervals on the parameter of interest; and scaling the cytometric data by transforming the parameter of interest based at least in part on the corresponding specified positive and negative intervals. The term scaling is used to mean a transformation of the relative distances between measurement values of a parameter of the cytometric data. In some cases, the ability to analyze high dimensionality cytometric data may be improved by displaying or otherwise analyzing cytometric data that has been scaled according to the present invention. In addition, the effectiveness of discovering populations within the cytometric data, i.e., clustering the cytometric data, may be improved by scaling the cytometric data according to the present invention and the analysis of such data may be improved by displaying or otherwise analyzing the results of clustering the scaled cytometric data. For example, when the cytometric data includes data about cells (i.e., when the particles in the sample are cells), applying the subject methods may help discover certain populations of cells that might otherwise have gone undetected and unanalyzed. When used in connection with flow cytometrically analyzing a sample, the subject methods can help mitigate the effects of measurement noise in a particle analysis system.

Cytometric Data

In practicing the subject methods, cytometric data for a sample is obtained. The cytometric data comprises measurements from particles irradiated in the sample flowing in a flow stream. For example, cytometric data may comprise measurements of light detected when the sample is irradiated with a light source and light from the sample is detected with a light detection system having one or more photodetectors. In embodiments, such measurements of light may comprise measurements of light intensity. As described in detail below, in some embodiments, the cytometric data may comprise measurements of one or more of: excitation light that is scattered by the particles along a mostly forward direction, excitation light that is scattered by the particles along a mostly sideways direction, and light emitted from fluorescent molecules or fluorescent dyes used to label the particles in one or more ranges of frequencies. In embodiments of the present invention, obtaining cytometric data for a sample comprises obtaining measurements from flow cytometrically analyzing the sample.

In some examples, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In some embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to cytometric data for samples obtained from human subjects of both genders and at any stage of development (i.e., neonates, infant, juvenile, adolescent, adult), where in certain embodiments the human subject is a juvenile, adolescent or adult. While the present invention may be applied to cytometric data for samples from a human subject, it is to be understood that the methods may also be carried-out on cytometric data for samples from other animal subjects (that is, in "non-human subjects") such as, but not limited to, birds, mice, rats, dogs, cats, livestock and horses.

In embodiments, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, a multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

The sample may be irradiated with one or more of the above-mentioned light sources, such as two or more light sources, such as three or more light sources, such as four or more light sources, such as five or more light sources and including ten or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be a plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g., laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the sample is sequentially irradiated with two or more light sources, the duration the sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., three or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. A light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as two or more lasers, such as three or more lasers, such as four or more lasers, such as five or more lasers and including ten or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., three or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as three or more radiofrequency drive signals, such as four or more radiofrequency drive signals, such as five or more radiofrequency drive signals, such as six or more radiofrequency drive signals, such as seven or more radiofrequency drive signals, such as eight or more radiofrequency drive signals, such as nine or more radiofrequency drive signals, such as ten or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, flow cytometry systems of the invention are configured for imaging particles in a flow stream by fluorescence imaging using radiofrequency tagged emission (FIRE), such as those described in Diebold, et al., *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

As discussed above, in embodiments, light from the irradiated sample is conveyed to a light detection system as described in greater detail below and measured by one or more photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of fluorophores. In some embodiments, methods include measuring collected light across the entire fluorescence spectrum of each fluorophore in the sample.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Identifying a Parameter of Interest and Specifying Positive and Negative Measurement Intervals Practicing the subject methods comprises identifying a parameter of interest. By parameter, it is meant one of a plurality of characteristics measured in the sample and comprising the cytometric data. Any characteristic of interest capable of measurement may comprise a parameter. For example, a parameter may correspond to measurement values for a specific range of wavelengths of light measured from irradiated sample particles. In some cases, a parameter may correspond to a channel of a detector used to detect certain wavelengths of light from irradiated sample particles. In other cases, a parameter may correspond to certain fluorescent light irradiated from sample particles. In embodiments of the subject methods, the plurality of measurement parameters ranges from two to about 300,000 measurement parameters.

By identifying a parameter of interest, it is meant selecting one of the plurality of parameters for scaling according to the subject methods. Embodiments of the subject methods scale cytometric data serially with respect to each parameter of the plurality of parameters that comprise the cytometric data. As such, identifying a parameter may comprise identifying one parameter from a list of parameters to be scaled. Parameters of interest may be identified based on any applicable criteria. In some cases, when the particles comprising the sample are cells, parameters of interest may be identified based on one or more types of cells that may be present in the sample and/or one or more fluorescent dye or label applied to the sample.

Subject methods further include specifying positive and negative measurement intervals on the parameter of interest. By measurement interval, it is meant a range of potential measurement values, such as a contiguous set of potential measurements, on the parameter of interest. In embodiments, measurement intervals can be bounded or unbounded. In embodiments, a bounded interval is an interval that has maximum and minimum measurement values; i.e., values that bound the interval. In embodiments, an unbounded interval is an interval that does not have either a maximum or minimum potential measurement value. By positive measurement interval it is meant an interval of potential measurements of the parameter of interest where the potential measurement values indicate the presence of a particular characteristic. By negative measurement interval it is meant an interval of potential measurements of the parameter of interest where the potential measurement values indicate the absence of such characteristic. In some cases, the positive and negative intervals are contiguous. For example, in embodiments, the maximum value of the negative interval may correspond to the minimum value of the positive range. Maximum and minimum values of an interval refer to upper and lower bounds of the interval, respectively. When such a contiguous configuration is the case, the positive and negative intervals can be specified using only three points: the point that is the minimum value of the negative measurement interval, the point that is both the maximum value of the negative measurement value as well as the minimum value of the positive measurement interval and, finally, the point that is the maximum value of the positive measurement range. In some cases, the minimum value, or lower bound, of the negative measurement interval is referred to as n; the maximum value or upper bound of the negative measurement interval is referred to as $n^+$; and the maximum value or upper bound of the positive measurement interval is referred to as p.

FIG. 1 depicts an exemplary histogram 100 of measurements of a parameter of interest of the cytometric data according to embodiments of the present invention. Seen in the figure are potential measurement values of the parameter of interest on the x-axis 110. The y-axis 120 of the histogram indicates event counts at each corresponding measurement value. Plot 130 shows a continuous line representing the number of events at different measurement values of the parameter of interest on the x-axis 110. Also shown are an exemplary negative measurement interval 140 and an exemplary positive measurement interval 150. The negative measurement interval is defined by a lower bound 160 and an upper bound 170. The positive measurement interval is defined by a lower bound 170 and an upper bound 180. Here, the positive and negative measurement intervals are contiguous ranges, where the upper bound of the negative measurement interval 170 is the same as the lower bound of the positive measurement interval 170.

In embodiments, any convenient means of selecting positive and negative intervals, such as positive interval 150 and negative interval 140, may be applied. In some cases, positive and negative intervals may be selected based on visual inspection. For example, positive and negative intervals may be selected based upon visual inspection of a plot of measurements of a parameter of interest, such as plot 100. That is, in some cases, a plot of the parameter of interest may be inspected for characteristic features indicative of positive or negative intervals and one or both of the positive and negative intervals may be selected based on such characteristics. In embodiments, specifying at least one of the positive and negative measurement intervals on the parameter of interest comprises performing one-dimensional gating to specify the intervals. By performing gating, it is meant determining a range of potential measurement values corresponding to a feature of interest in the underlying particles, the measurements of which comprise the cytometric data. That is, gating refers to defining certain boundaries within parameter of interest such that measurements that fall within the boundaries correspond to particles of interest. Any convenient method for determining a gate for the parameter of interest may be applied. Because such a gate would apply to measurements of the parameter of interest only, such gate is referred to as a one-dimensional gate.

In some instances, a positive measurement interval may be determined by computing a probability corresponding to each measurement value of the parameter of interest for the events comprising the cytometric data. Such computed probability represents the likelihood that a measurement value exhibits a particular characteristic, i.e., a characteristic of interest. In other words, each measurement of the parameter of interest is assigned a probability of whether the measurement value exhibits the characteristic of interest. In some cases, the probabilities associated with each parameter of interest taken together may determine the positive measurement interval. Any convenient means of computing the probabilities that a measurement value exhibits a particular characteristic may be employed, including, for example, computing probabilities based on, or otherwise taking into account, data obtained from other events in the cytometric data, such as a histogram of measurements of the parameter of interest from other events in the cytometric data, cytometric data from other samples, other characteristics of the event, such as measurements of parameters other than the parameter of interest, or the like. Similarly, in embodiments, the negative measurement interval may be determined based on a computed probability that a measurement of the parameter of interest does not exhibit a particular characteristic. In some cases, the negative measurement interval may be identified as an interval that is distinct from the positive measurement interval. In embodiments, the probability that a measurement does not exhibit a characteristic of interest may be computed based on whether the measurement value falls within such a negative measurement interval. In some cases, the probability that a measurement does not exhibit a characteristic of interest may be computed based on whether the measurement value falls within an interval that is not the positive measurement interval.

In contrast to performing one-dimensional gating on the parameter of interest to determine the positive and/or negative intervals, other techniques for specifying the positive and/or negative intervals may determine such intervals automatically. Such techniques, include but are not limited to, for example, applying fluorescence minus one control techniques, applying a mathematical model or applying a machine learning algorithm. By automatically determining the positive and/or negative intervals, it is meant that the technique itself (e.g., the mathematical model alone and not specification in whole or in part from a user, for example) produces predictions of the positive and/or negative intervals, based at least in part on the cytometric data, including the parameter of interest. Techniques comprising applying fluorescence minus one control, applying a mathematical model and applying a machine learning algorithm, in each case, to specify one or both of the positive and/or negative intervals, are discussed in further detail below.

In other embodiments, specifying at least one of the positive and negative measurement intervals on the parameter of interest comprises applying a fluorescence minus one control to specify the intervals. By fluorescence minus one control, it is meant the technique that is well-known in the art, also referred to as FMO control, in which all but one of the applicable fluorescent dyes, stains or the like are applied to particles of the sample. Based on cytometric data obtained from a sample prepared as such, the technique may be used to ascertain a threshold value distinguishing between background fluorescence and meaningful results. Such threshold may then be applied for selecting and specifying at least one of the positive and negative measurement intervals. In embodiments, applying fluorescence minus one techniques results in discovering only cells that are negative for a given parameter, i.e., cells that do not exhibit a particular characteristic in the given parameter. As a result, fluorescence minus one techniques can be used to define an interpercentile range of the negative distribution, which could then be taken as the negative measurement interval (i.e., negative range or negative interval).

In still other embodiments, specifying at least one of the positive and negative measurement intervals on the parameter of interest comprises applying a mathematical model to specify the intervals. By mathematical model, it is meant any convenient model, such as a computation-based model, capable of identifying a putative positive and/or negative interval. In some cases, a mathematical model may take into account only the cytometric data corresponding to the parameter of interest. In other cases, the mathematical model may take into account the cytometric data corresponding to other parameters of the cytometric data besides only the parameter of interest. In still other cases, the mathematical model may consider cytometric data collected based on other samples of other experimental data. The mathematical model may be an iterative mathematical model designed to repeatedly refine definitions of positive and/or negative intervals subject to certain constraints. In some embodiments, the mathematical model may take into account measured noise characteristics of the detection channels, a spillover matrix, and/or a cell expression profile.

In other embodiments, specifying one or both of the positive and negative measurement intervals on the parameter of interest comprises applying a machine learning algorithm to specify the intervals. By machine learning algorithm, it is meant any convenient computer algorithm designed to automatically learn through experience. In embodiments, relevant machine learning algorithms may employ supervised learning, unsupervised learning or reinforcement learning approaches to predicting the positive and/or negative intervals. Relevant machine learning algorithms may employ regression and classification techniques to arrive at predictions of positive and or negative intervals. In embodiments, relevant experience used to train such a learning algorithm may comprise, for example, specifically constructed training data or previously collected cytometric data or parameters other than the parameter of interest, or combinations thereof.

Scaling the Cytometric Data

Practicing the subject methods further comprises scaling the cytometric data by transforming the parameter of interest based at least in part on the corresponding specified positive and negative intervals. In some cases, transforming the parameter of interest means adjusting the scale of measurement values applicable to the parameter of interest. Embodiments of the present invention transform the parameter of interest based, at least in part, on each of the positive and negative intervals.

An objective of some embodiments of the subject methods is to reduce the detrimental effect of background noise, or measurement noise, that can make it more difficult to analyze cytometric data, in particular, high-dimensionality cytometric data. Reducing the detrimental effect of background noise can be accomplished, in part, in embodiments of the subject methods, by transforming the parameter of interest to reduce the standard deviation of the negative interval. This has the effect of compressing the background noise in the data. Therefore, in some embodiments, transforming the parameter of interest comprises rescaling the specified negative measurement interval for the parameter of interest. In such embodiments, in some cases, rescaling the specified negative measurement interval for the parameter of interest comprises reducing the standard deviation of the specified negative measurement interval for the parameter of interest.

Further, with respect to the positive interval, embodiments according to the subject methods, can improve the ability to analyze the cytometric data by rescaling the positive interval. Rescaling the positive interval, in some cases, may have the effect of improving the effectiveness of clustering algorithms applied to the cytometric data, including the parameter of interest. Therefore, in some embodiments, transforming the parameter of interest further comprises rescaling the specified positive measurement interval for the parameter of interest. In such embodiments, rescaling the specified positive measurement interval comprises rescaling the positive measurement interval to a predetermined size. Any predetermined size may be applied. In embodiments, the predetermined size is the size of the negative measurement interval. In other embodiments, the predetermined size is the size of a positive measurement interval for a different parameter, i.e., a parameter of the plurality of parameters that is not the parameter of interest. In some cases, the predetermined size is selected so that the scaled positive interval is the same size for every scaled parameter of the plurality of parameters comprising the cytometric data.

In certain embodiments, scaling the cytometric data comprises differentially transforming each measurement of the parameter of interest in the cytometric data based on the probability of the measured value exhibiting a characteristic of interest. That is, each measurement of the parameter of interest of an event in the cytometric data is transformed, differentially, based at least in part on the computed probability (as described above) that the measured value exhibits a particular characteristic. In such cases, scaling of the parameter of interest is achieved by transformation of each measured value of the parameter of interest in the cytometric data, where such transformation is a differential transformation based at least in part on the probability that each measured value exhibits a particular characteristic.

In certain embodiments, transforming the parameter of interest comprises adaptively scaling the parameter of interest accordingly based on a prescribed mathematical approach. For example, in some cases, transforming the parameter of interest comprises adaptively scaling the parameter of interest according to the following formula:

$$s(x) = \frac{g(z(x))}{g(z(p))}(1 + (c - 1)\Phi_{z(n^+),1}(z(x)))$$

where each of the terms in the formula above have the following meanings:

s(x) represents the adaptively scaled measurements of the parameter of interest. That is, represents the output value resulting from a transformation of the parameter of interest based at least in part on the corresponding specified positive and negative intervals.

x represents unscaled measurements of the parameter of interest. That is, x represents values of the parameter of interest included in the obtained cytometric data. In other words, x represents the raw data values.

$(n^-, n^+)$ is the specified negative measurement interval of the parameter of interest. In other words, the measurement value of the parameter of interest, $n^-$, is the lower bound of the negative interval, and the measurement value of the parameter of interest, $n^+$, is the upper bound of the negative interval.

$(n^+, p)$ is the specified positive measurement interval of the parameter of interest. In other words, the measurement value of the parameter of interest, $n^+$, is the lower bound of the positive interval, and the measurement value of the parameter of interest, p, is the upper bound of the positive interval. Because the upper bound of the negative interval and the lower bound of the positive interval are the same measurement value, it is the case that the negative and positive intervals are contiguous, where the negative interval falls at lower measurement values than the positive interval. Also, once the negative interval is defined, the positive interval can be defined by specifying only a single measurement value, the upper bound of the positive interval.

c is a compression factor. Qualitatively, the compression factor is a number used to determine how much bigger the signal should be compared to the noise in the context of upscaling the positive values. That is, positive values (such as, for example, those values that have a Z-score of three or higher) are upscaled by multiplying them by the compression factor, also referred to as the noise compression factor. Setting the compression factor to the minimum possible compression factor value of 1.0 would mean that no compression would be applied in the transformation. In some cases, the compression factor is set to a value of 50. In certain embodiments, the default compression factor is set to a value of 70.

$\overline{X}$ is the median of the negative measurement interval. That is, $\overline{X}$ is the middle value of the previously specified negative measurement interval.

SD is the standard deviation of the negative measurement interval and is calculated according to $$SD = \frac{IQR}{1.36},$$

where IQR is the interquartile range of the negative measurement interval. By interquartile range, it is meant the range between the 75th and 25th percentiles of the negative measurement interval (i.e., the range between the upper and lower quartiles of the negative measurement interval).

z(x) is a z-transform according to:

$$z(x) = \frac{x - \overline{X}}{SD}.$$

In some cases, an effect of applying a z-transform to the raw data values of the parameter of interest is to make the mean of the resulting transformed values equal to 0 and the standard deviation of the transformed values equal to 1.

g(z) is an inverse hyperbolic sine function according to: $g(z) = \ln(z + \sqrt{z^2 + 1})$. In other words, the values are further transformed using an arcsinh function. Such function is a basic variant of the gLog function, which is known in the art, used in, for example, CyTOF data transformation.

$\Phi_{z(n^+),1}$ is a cumulative distribution function (CDF) of standard normal distribution with $\mu = z(n^+)$ and $\sigma = 1$. This CDF is used in connection with the transition between the positive and negative intervals. In particular, the CDF facilitates smoothing the transition between positive and negative intervals by weighting the amount of scaling using a sigmoid function, e.g., the CDF, that is centered at the noise cutoff, for example, a transformed value of 3.0. In some cases, the smoothed transition may be warranted due to a transition between the negative interval that does not get scaled and the positive interval that does get scaled.

Figure 2:
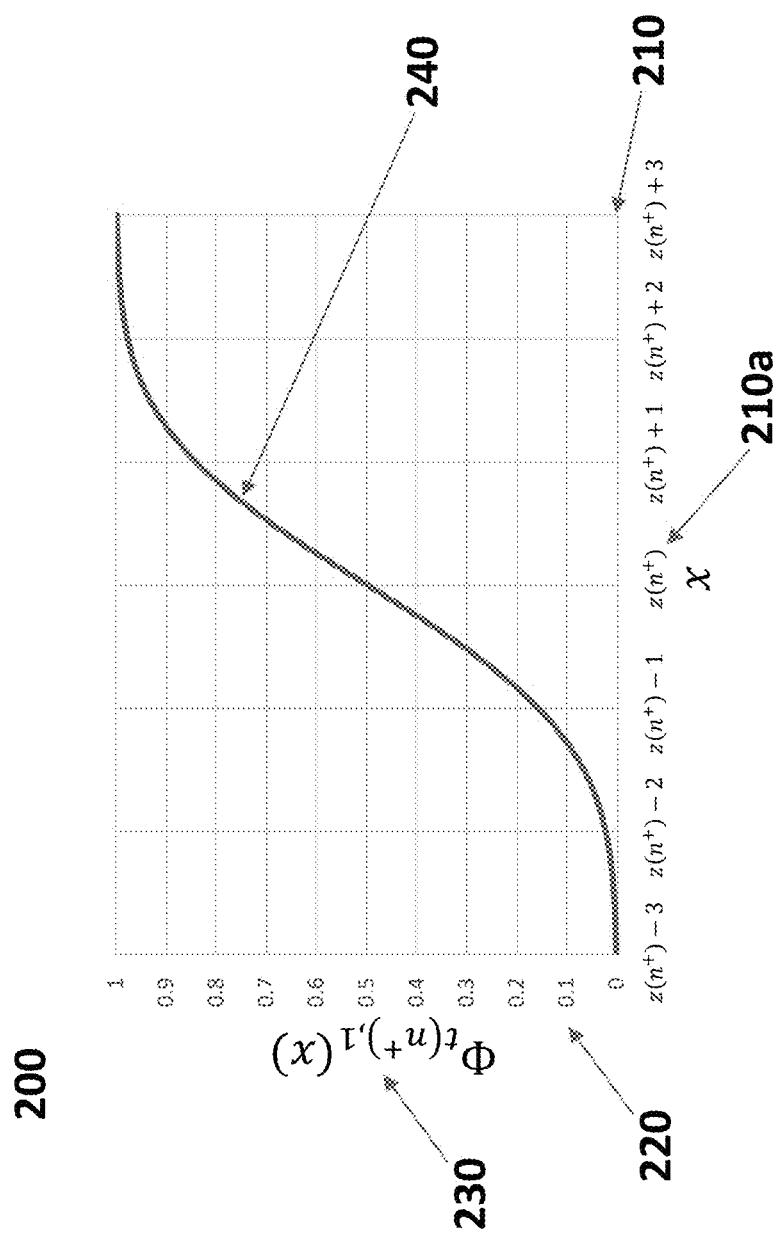
FIG. 2 depicts an exemplary cumulative distribution function 200 in accordance with certain embodiments.

FIG. 2 depicts an exemplary cumulative distribution function 200 in accordance with the cumulative distribution functions described above. Seen in FIG. 2 are potential z-transformed measurement values of the parameter of interest on the x-axis 210. The y-axis 220 of the plot indicates cumulative distribution function at each corresponding z-transformed value. Z-transformed values of measurement values of the parameter of interest, with reference to the upper bound of the negative interval, $n^+$, are seen along the x-axis, for example, the mean value of the cumulative distribution function, $z(n^+)$, seen at position 210a on the x-axis. The cumulative distribution function is shown in symbolic form 230. As described above, the cumulative distribution function may be applied to smooth a transition between transformed negative and positive intervals. Such smoothing is enabled in part based on the sigmoid shape of the plot of the cumulative distribution function 240.

Displaying, Analyzing and Clustering Cytometric Data

Practicing the subject methods may, in some embodiments, further comprise displaying the scaled cytometric data. Any convenient format of display may be employed. For example, any display technique used to display cytometric data that has not been scaled according to the subject methods may be employed to display cytometric data that has been scaled according to the subject methods. In embodiments, the scaled cytometric data may be displayed on, for example, a one-dimensional plot, where the x-axis represents measurement values scaled according to the subject methods and the y-axis indicates event counts corresponding to each scaled measurement value. In other embodiments, the scaled cytometric data may be displayed on, for example, a two-dimensional plot, where each axis represents measurement values scaled according to the subject methods and event counts are represented by, for example, the color or greyscale shade used to display the points or areas on the two-dimensional plot. In embodiments, displaying the scaled cytometric data comprises displaying a plot of cytometric data comprising the transformed parameter of interest. That is, the scaled parameter of interest may be displayed as the one dimension, i.e., the x-axis, in a one-dimensional plot or one or the two dimensions, i.e., the x-axis or the y-axis in a two-dimensional plot.

Embodiments of the subject methods may further comprise: identifying one or more additional parameters of interest; specifying positive and negative measurement intervals on each additional parameter of interest; and scaling the cytometric data by transforming each additional parameter of interest based at least in part on the corresponding specified positive and negative intervals. In other words, embodiments of the subject methods may comprise scaling more than one parameter of the cytometric data. As such, the steps of identifying additional parameters of interest, specifying positive and negative intervals and scaling data by applying a transformation may be conducted for additional parameters of interest in ways that are analogous to the ways employed for a single parameter of interest, as described above. Any number of additional parameters of interest may be identified and scaled. In some cases, only a subset of the plurality of parameters that make up the cytometric data may be identified and scaled. In other cases, all of the parameters that make up the cytometric data may be identified and scaled. In some embodiments of the subject methods in which more than one parameter of the cytometric data is scaled, the positive measurement intervals are scaled to be the same size. Scaling positive intervals to be the same size in some cases can facilitate analysis of the cytometric data by, for example, improving the effectiveness of clustering algorithms or reducing the effect of noise because scaling each positive interval to the same size can have the effect of equalizing the contribution of both weak and strong markers in the cytometric data.

Certain embodiments of the subject methods further comprise analyzing scaled data. By scaled data, it is meant data that is transformed according to the subject methods. In some cases, scaled data may comprise data that is differentially transformed based on computed probabilities of whether measurement values of the parameter of interest for events that comprise the cytometric data exhibit a particular characteristic. By analyzing transformed data, it is meant studying, understanding and/or characterizing the cytometric data. For example, analyzing transformed data may comprise analyzing such data using at least a first data analysis algorithm. In other cases, analyzing transformed data comprises analyzing such data using a first data analysis algorithm as well as one or more additional data analysis algorithms. Data analysis algorithms may be any convenient or useful algorithm for use in drawing inferences from the cytometric data. For example, in some embodiments, data analysis algorithms may entail data clustering algorithms, as described below. In other embodiments, data analysis algorithms may comprise dimensionality reduction algorithms, feature extraction algorithms, pattern recognition algorithms, or the like to, for example, facilitate visualizing multi-dimensional data.

Other embodiments of the subject methods further comprise clustering the cytometric data by applying a clustering algorithm to the scaled cytometric data. That is, using the scaled cytometric data as an input to a clustering algorithm, so that the clustering algorithm identifies clusters within the scaled cytometric data, as opposed to, for example, the raw cytometric data. By clustering, it is meant any algorithm, technique or method used to identify subpopulations of data within cytometric data, where each element of a subpopulation shares certain characteristics with each other element of the subpopulation.

Any convenient clustering algorithm may be applied to identify clusters within the scaled cytometric data. In some cases, population clusters can be identified (as well as gates that define the limits of the populations) can be determined automatically. Examples of methods for automated gating have been described in, for example, U.S. Pat. Nos. 4,845,653; 5,627,040; 5,739,000; 5,795,727; 5,962,238; 6,014,904; and 6,944,338; and U.S. Pat. Pub. No. 2012/0245889, each incorporated herein by reference.

In some cases, assigning particles of the scaled cytometric data to clusters comprises applying the technique known in the art, referred to as k-means clustering. By "k-means clustering" it is meant the known partitioning technique that aims to partition data points for each event or cell of a test sample into k clusters so that each data point belongs to the cluster with the nearest mean. The technique of k-means clustering, including various popular embodiments that utilize k-means clustering, is further described in L. M. Weber and M. D. Robinson, *Comparison of Clustering Methods for High-Dimensional Single-Cell Flow and Mass Cytometry Data*, Cytometry, Part A, Journal of Quantitative Cell Science, at Vol. 89, Issue 12, pp. 1084-96, the entirety of which is incorporated herein by reference.

In other cases, assigning particles of the scaled cytometric data to clusters comprises applying the technique known in the art, referred to as applying a Self-Organizing Map. By "Self-Organizing Map," it is meant applying a type of artificial neural network algorithm that, as a result of the neural network training step, produces a map, in this case, where the map comprises a collection of clusters defining the data points or cells of a sample. The technique of applying a Self-Organizing Map, including the popular embodiment of the Self-Organizing Map, FlowSOM, is further described in L. M. Weber and M. D. Robinson, *Comparison of Clustering Methods for High-Dimensional Single-Cell Flow and Mass Cytometry Data*, Cytometry, Part A, Journal of Quantitative Cell Science, at Vol. 89, Issue 12, pp. 1084-96, the entirety of which is incorporated herein by reference. Other known or yet to be discovered clustering techniques or algorithms may be applied as desired.

In still other cases, assigning particles of the scaled cytometric data to clusters comprises applying the technique known in the art, as the X-Shift population finding algorithm. The X-Shift algorithm, as well as practical applications thereof, is further described in N. Samusik, Z. Good, M. H. Spitzer, K. L. Davis & G. P. Nolan (2016), *Automated*

*mapping of phenotype space with single-cell data*. Nature methods, at Vol. 13, Issue 6, p. 493, the entirety of which is incorporated herein by reference. Other known or yet to be discovered clustering techniques or algorithms may be applied as desired.

In some cases, the scaled cytometric data is used to improve the performance of a clustering algorithm applied to the cytometric data. That is, a clustering algorithm may perform better when applied to cytometric data scaled according to the subject methods, as opposed to the raw, unscaled cytometric data. By perform better, it is meant that the clustering algorithm when applied to the scaled cytometric data is able to identify subpopulations of particles, such as cells, that would otherwise have gone undetected. That is, a clustering algorithm applied to scaled cytometric data may identify distinct subpopulations of data that would otherwise have been clustered into a single, larger subpopulation. In general, a clustering algorithm performs better when the results produced by the clustering algorithm more closely reflect the physical properties of the sample from which the cytometric data was generated.

In some cases, the scaled cytometric data is used to reduce the effect of measurement noise. By measurement noise, it is meant signals generated during the collection of the cytometric data that do not correspond to physical properties of the underlying sample but instead to instrumentation issues or random or unknown causes. In some cases, the performance of a clustering algorithm is improved when applied to the scaled cytometric data because the scaled cytometric data reduces the amount of noise in the data. For example, in some embodiments of the subject methods, the particles the sample are cells. In such embodiments, the scaled cytometric data may be used to distinguish between two similar populations of cells.

In embodiments, displaying the scaled cytometric data comprises displaying the clusters of the scaled cytometric data. That is, when cytometric data that has been scaled according to the present methods is displayed, information identifying clusters on the display may also be displayed. Clusters may be identified in the display using any convenient technique, such as labeling or color coding or other methods. In some cases, when using the scaled cytometric data improves the performance of a clustering algorithm applied to the cytometric data, the display of the clusters in the scaled cytometric data may facilitate distinguishing between two populations of particles that might otherwise have gone undetected. That is, whereas two types of, for example, cells might have been grouped into a single cluster of cells by a clustering algorithm applied to unscaled cytometric data, the clustering algorithm might instead identify the two types of cells by clustering them each into their own clusters when applied to the cytometric data. Each cluster would then be displayed in a display of the clustered data for visual review and further analysis.

Systems for Scaling Cytometric Data

As summarized above, aspects of the present disclosure include a system that is configured for scaling cytometric data. Systems according to certain embodiments comprise an apparatus configured to obtain cytometric data comprising measurements of a plurality of parameters from particles irradiated in the sample flowing in a flow stream; a processor comprising memory operably coupled to the processor, wherein the memory comprises instructions stored thereon, which, when executed by the processor, cause the processor to: identify a parameter of interest; specify positive and negative measurement intervals on the parameter of interest; and scale the cytometric data by transforming the parameter of interest based at least in part on the corresponding specified positive and negative intervals. Scaling the cytometric data by transforming the parameter of interest based in part on positive and negative intervals is described above. Systems and devices for use in collecting measurements that comprise cytometric data are discussed below.

Light Source

In embodiments, with respect to the cytometric data, particles in the sample flowing in a flow stream may be irradiated using a light source. The light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof.

In other cases, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, a multi-LED integrated light source. In some instances, the non-laser light source is a stabilized fiber-coupled broadband light source, white light source, among other light sources or any combination thereof.

The light source may be positioned any suitable distance from the sample flowing in a flow stream (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest may irradiate the sample using a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer-controlled beam stops for blocking and exposing the sample to the light source.

In some cases, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof; a semiconductor diode laser, optically pumped semiconductor laser (OPSL), or a frequency doubled or frequency tripled implementation of any of the above mentioned lasers.

In certain instances, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser, such as described above.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In instances, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory that may include instructions to produce 100 or more angularly deflected laser beams with the same intensities. In other embodiments, the memory may include instructions to produce two or more angularly deflected laser beams with different intensities, such as 3 or more, such as 4 or more, such as 5 or more, such as 10 or more, such as 25 or more, such as 50 or more and including memory that may include instructions to produce 100 or more angularly deflected laser beams with different intensities.

In certain cases, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other cases, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other cases, the controller has a processor having memory operably coupled to the processor such that the memory includes instructions stored thereon, which when executed by the processor, cause the processor to produce an output laser beam having an intensity profile with a Gaussian distribution along the horizontal axis. In still other cases, the controller has a processor having memory operably coupled to the processor such that the memory includes instructions stored thereon, which when executed by the processor, cause the processor to produce an output laser beam having a top hat intensity profile along the horizontal axis.

In instances, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some instances, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Detectors

In embodiments, cytometric data may consist of measurements of light detected from particles irradiated in the sample flowing in a flow stream (in some cases, measurements comprise measurements of a plurality of parameters of light). Light detection systems may be employed to measure such light from particles of the sample. Light detection systems may have one or more photodetectors. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In instances, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain cases, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 m to 125 µm and including from 50 µm to 100 µm, where the surface area of each photodetector (e.g., photodiode) in the array ranges from 25 to µm² to 10000 µm², such as from 50 to µm² to 9000 µm², such as from 75 to µm² to 8000 µm², such as from 100 to µm² to 7000 µm², such as from 150 to µm² to 6000 µm² and including from 200 to µm² to 5000 µm².

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm² to 10000 mm², such as from 0.5 mm² to 5000 mm², such as from 1 mm² to 1000 mm², such as from 5 mm² to 500 mm², and including from 10 mm² to 100 mm².

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay. In some embodiments, photodetectors are configured to measure collected light across the entire fluorescence spectrum of each fluorophore in the sample.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Configuration of Processor and Memory

Systems according to the present disclosure comprise a processor having memory operably coupled to the processor where the memory includes instructions stored thereon which when executed by the processor cause the processor to identify a parameter of interest; specify positive and negative measurement intervals on the parameter of interest; and scale the cytometric data by transforming the parameter of interest based at least in part on the corresponding specified positive and negative intervals.

In instances, the processor and/or memory may be operably connected to an apparatus configured to obtain cytometric data comprising measurements of a plurality of parameters from particles irradiated in the sample flowing in a flow stream. Such operable connection may take any convenient form such that cytometric data may be obtained by the processor by any convenient input technique, such as via a wired or wireless network connection, shared memory, a bus or similar communication protocol with a source of cytometric data, such as an ethernet connection or a Universal Serial Bus (USB) connection, portable memory devices or the like.

In embodiments, after cytometric data is obtained (e.g., by or from a flow cytometer), the processor and memory are configured to identify a parameter of interest. A parameter of interest may be identified in any convenient manner. For example, in some cases, the processor and memory may be configured to receive input data corresponding to a selection identifying a parameter of interest. In other examples, the processor and memory may be configured to select a parameter of interest from a list of potential parameters of interest, for example, by iterating through a list of one or more potential parameters. In some cases, the processor and memory may be configured to receive input regarding characteristics of a plot to be displayed and are further configured to identify the parameter of interest based on the characteristics of the plot.

In embodiments of systems according to the present disclosure, the processor and memory are further configured to specify positive and negative measurement intervals on the parameter of interest. Such positive and negative measurement intervals may be identified in any convenient manner. For example, in some cases, the processor and memory may be configured to receive input data corresponding to at least one range of measurement data corresponding to either the positive or negative measurement interval or both intervals. In other embodiments, the memory comprises further instructions stored thereon, which, when executed by the processor, cause the processor to use one-dimensional gating to specify at least one of the positive and negative measurement intervals on the parameter of interest. As described above, the characteristics of such gate may be manually or automatically (e.g., algorithmically) defined. For example, in such embodiments, the processor may be configured to receive as input one-dimensional gates specifying the positive and negative measurement intervals on the parameter of interest. In still other embodiments, the memory comprises further instructions stored thereon, which, when executed by the processor, cause the processor to apply a fluorescence minus one control to specify at least one of the positive and negative measurement intervals on the parameter of interest. In some instances, the memory comprises further instructions stored thereon, which, when executed by the processor, cause the processor to apply a mathematical model to specify at least one of the positive and negative measurement intervals on the parameter of interest. In other instances, the memory comprises further instructions stored thereon, which, when executed by the processor, cause the processor to apply a machine learning algorithm to specify one or both of the positive and negative measurement intervals on the parameter of interest.

In embodiments of systems according to the present disclosure, the processor and memory are further configured to scale the cytometric data by transforming the parameter of interest based at least in part on the corresponding specified positive and negative intervals. In some embodiments, the memory comprises further instructions stored thereon, which, when executed by the processor, cause the processor to transform the parameter of interest by rescaling the specified negative measurement interval for the parameter of interest. In such embodiments, the memory may comprise further instructions stored thereon, which, when executed by the processor, cause the processor to rescale the specified negative measurement interval for the parameter of interest by reducing the standard deviation of the specified negative measurement interval for the parameter of interest.

In certain embodiments, the memory comprises further instructions stored thereon, which, when executed by the processor, cause the processor to further transform the parameter of interest by rescaling the specified positive measurement interval for the parameter of interest. In other embodiments, rescaling the specified positive measurement interval comprises rescaling the positive measurement interval to a predetermined size. The predetermined size of the scaled positive measurement interval may be any convenient size and may vary as desired. In some cases, the predetermined size is the size of the negative measurement interval. In other cases, the predetermined size is the size of a scaled positive measurement interval corresponding to a second parameter of the plurality of parameters.

In embodiments, the memory comprises further instructions stored thereon, which, when executed by the processor, cause the processor to transform the parameter of interest by adaptively scaling the parameter of interest according to:

$$s(x) = \frac{g(z(x))}{g(z(p))}(1 + (c-1)\Phi_{z(n^+),1}(z(x))).$$

As described in detail above with respect to methods according to the present disclosure, s(x) represents the adaptively scaled measurements of the parameter of interest; x represents unscaled measurements of the parameter of interest; $(n^-, n^+)$ is the specified negative measurement interval of the parameter; $(n^+, p)$ is the specified positive measurement interval of the parameter; c is a compression factor; $\overline{X}$ is the median of the negative measurement interval; SD is the standard deviation of the negative measurement interval and is calculated according to $$SD = \frac{IQR}{1.36},$$

where IQR is the interquartile range of the negative measurement interval; z(x) is a z-transform according to:

$$z(x) = \frac{x - \overline{X}}{SD};$$

g(z) is an inverse hyperbolic sine function according to: $g(z) = \ln(z + \sqrt{z^{2+1}})$; and $\Phi_{z(n^+),1}$ is a cumulative distribution function of standard normal distribution with $\mu = z(n^+)$ and $\sigma = 1$. The noise compression factor may be set to any convenient value and may vary as desired. The minimum value of the noise compression factor is 1.0, and the default value may be set to 70.

In embodiments, the memory comprises further instructions stored thereon, which, when executed by the processor, cause the processor to cause the scaled cytometric data to be displayed on a display device. In such embodiments, the system is configured to cause the scaled cytometric data to be displayed on a display device by causing the display of a plot of cytometric data comprising the transformed parameter of interest. Any convenient display device, such as a liquid crystal display (LCD), light-emitting diode (LED) display, plasma (PDP) display, quantum dot (QLED) display or cathode ray tube display device. The processor and/or memory may be operably connected to the display device, for example, via a wired, such as a Universal Serial Bus (USB) connection, or wireless connection, such as a Bluetooth connection. In some cases, a two-dimensional plot is displayed, depicting measurement of at least two parameters comprising the cytometric data, in which at least one of the parameters is transformed, for example, scaled as described herein.

In embodiments, the memory comprises further instructions stored thereon, which, when executed by the processor, cause the processor to: identify one or more additional parameters of interest; specify positive and negative measurement intervals on each additional parameter of interest; and scale the cytometric data by transforming each additional parameter of interest based at least in part on the corresponding specified positive and negative intervals. In other words, in some cases, systems may be configured to transform more than one parameter of the cytometric data by scaling such parameters as described herein. In some cases, the processor causes the scaled cytometric data to be displayed by displaying each of the parameters scaled as described herein, on, for example, a two-dimensional plot or a three-dimensional plot.

In other embodiments, the memory comprises further instructions stored thereon, which, when executed by the processor, cause the processor to cluster the cytometric data by applying a clustering algorithm to the scaled cytometric data. The processor and memory may be configured to cluster the scaled cytometric data according to any convenient clustering algorithm, such as those described herein, including k-means clustering, Self-Organizing Map, X-Shift or other known or yet to be discovered clustering routine. In such embodiments, the memory may comprise further instructions stored thereon, which, when executed by the processor, cause the processor to cause the display of the clusters of the scaled cytometric data. In some cases, the system is configured to scale the cytometric data such that the performance of a clustering algorithm applied to the cytometric data is improved. The performance of the clustering algorithm may be improved in any number of ways, for example, by enabling the clustering algorithm to discover additional populations of distinct particle types, such as distinct cells or by identifying particles as belonging to a cluster when such particles would otherwise have been disregarded by the clustering algorithm, i.e., not classified as belonging to a population or a meaningful cluster of particles. In some cases, the performance of the clustering algorithm is improved because scaling the cytometric data, as described herein, may reduce the influence of noise on the measurements of particles that make up the cytometric data. In certain embodiments, the system is configured to scale the cytometric data such that the effect of measurement noise is reduced. In other embodiments, the particles are cells. In such cases, the system is configured to distinguish between two similar populations of cells based on the scaled cytometric data. That is, the system may be configured to identify differences between cell types that might otherwise have been understood to belong to the same cell type when, in fact, the cells are different types of cells.

In embodiments, the cytometric data is high dimensionality data. By high dimensionality data, it is meant that the cytometric data includes a large number of different measurement parameters. In other words, the cytometric data represents measurements of many different characteristics of the particles. In some cases, the plurality of measurement parameters ranges from two to about 300,000 measurement parameters. In some embodiments, the cytometric data for a sample comprises measurements obtained from a flow cytometer configured to analyze the sample. In some cases, the apparatus configured to obtain cytometric data may be a flow cytometer or in other cases may be an input device, such as a wired or wireless input device, configured to obtain cytometric data from a flow cytometer.

Particle Analyzers

Systems according to the disclosed invention further comprise an apparatus configured to obtain cytometric data comprising measurements of a plurality of parameters from particles irradiated in the sample flowing in a flow stream. In some embodiments of systems, the apparatus is configured to obtain the cytometric data by analyzing the sample by irradiating particles in the sample flowing in a flow stream. In other embodiments, the apparatus is an input device configured to obtain cytometric data from a particle analyzer or sorting system or the like, such as those described herein.

Figure 3:
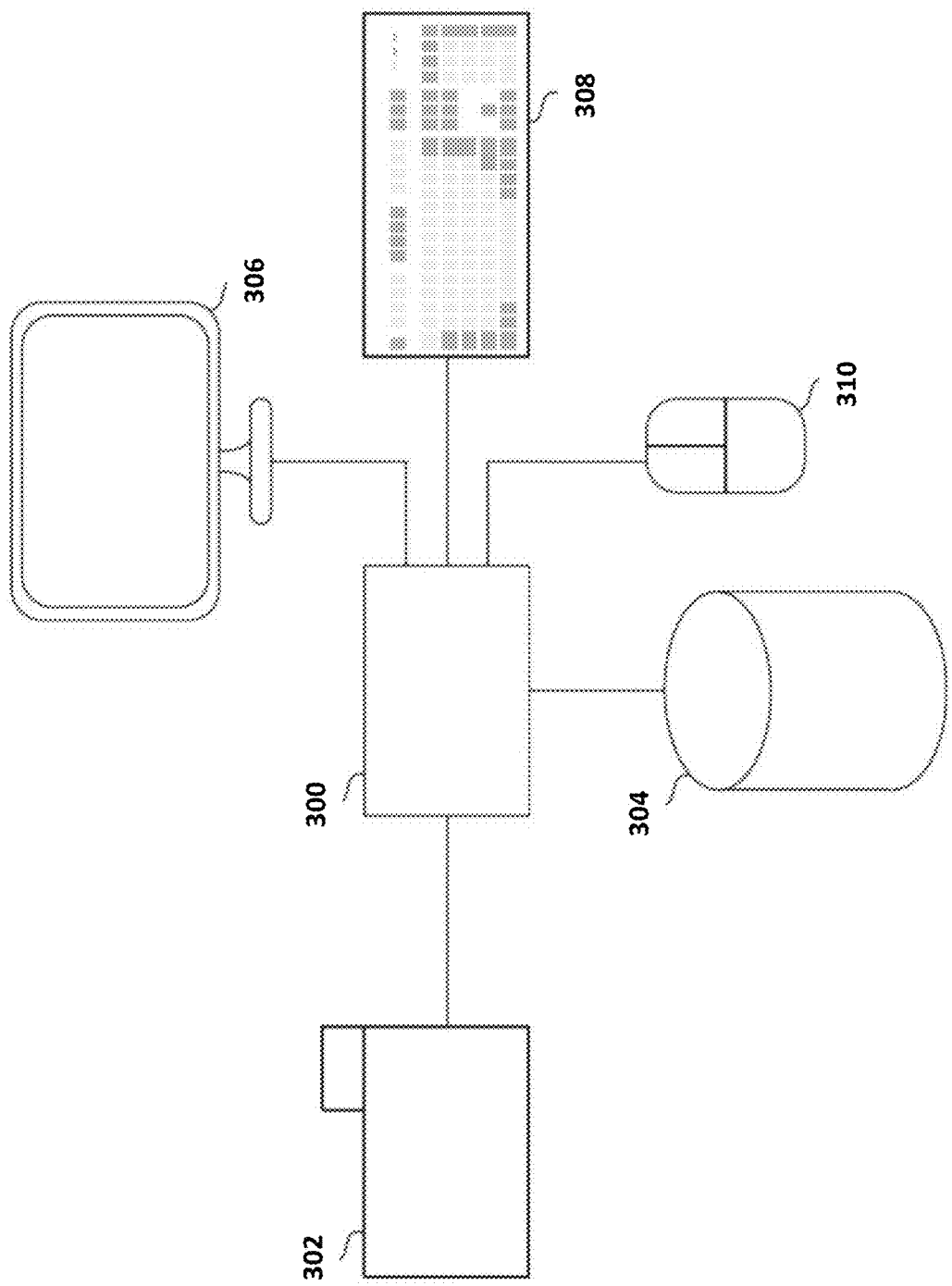
FIG. 3 depicts a functional block diagram for one example of a control system of a particle analyzer according to certain embodiments.

FIG. 3 shows a functional block diagram for one example of a particle analyzer or sorting control system, such as an analytics controller, i.e., a processor operably connected to memory, 300, for analyzing and displaying data. A processor 300 can be configured to implement a variety of processes for controlling graphic display of data, including biological events.

An apparatus, 302 can be configured to acquire cytometric data, such as biological event data. For example, a flow cytometer can generate flow cytometric event data. In embodiments, the apparatus may be, or may be operably connected to, a particle analyzer or sorting system, such as a flow cytometer. The apparatus 302 can be configured to provide biological event data to the processor 300. A data communication channel can be included between the apparatus 302 and the processor 300. The biological event data can be provided to the processor 300 via the data communication channel.

The processor 300 can be configured to receive biological event data from the apparatus 302. The biological event data received from the apparatus 302 can include flow cytometric event data. The processor 300 can be configured to provide a graphical display including a display of one or more histograms of cytometric data or a first plot of biological event data or a plot showing cluster data for the cytometric data to a display device 306. For example, processor 300 can be configured to cause a display device 306 to display scaled cytometric data. The processor 300 can be further configured to render a region of interest as a gate around a population of biological event data shown by the display device 306, overlaid upon the first plot, for example. In some embodiments, the gate can be a logical combination of one or more graphical regions of interest drawn upon a single parameter histogram or bivariate plot. In some embodiments, the display can be used to display particle parameters. In some embodiments, the display can be used to display settings applicable to apparatus 302 in conjunction with histograms of cytometric data, for use in calibrating detectors of apparatus 302.

The processor 300 can be further configured to display data on the display device 306 within the gate differently from other events in the data outside of the gate. For example, the processor 300 can be configured to render the color of, for example, biological event data contained within the gate to be distinct from the color of biological event data outside of the gate. The display device 306 can be implemented as a monitor, a tablet computer, a smartphone, or other electronic device configured to present graphical interfaces.

The processor 300 can be configured to receive adjustments to configuration settings for the apparatus 302 from the first input device. Such adjustments to configuration settings, when received from the first input device to the processor 300 can be used to update the settings of the apparatus 302, such as particle analyzer settings. For example, in embodiments, gain settings for a channel detector may be adjusted in order to avoid saturation of the channel detector.

In addition, the processor 300 can be configured to receive a gate selection signal identifying the gate from a first input device. For example, the first input device can be implemented as a mouse 310. The mouse 310 can initiate a gate selection signal to the processor 300 identifying the gate to be displayed on or manipulated via the display device 306 (e.g., by clicking on or in the desired gate when the cursor is positioned there). In some implementations, the first device can be implemented as the keyboard 308 or other means for providing an input signal to the processor 300 such as a touchscreen, a stylus, an optical detector, or a voice recognition system. Some input devices can include multiple inputting functions. In such implementations, the inputting functions can each be considered an input device. For example, as shown in FIG. 3, the mouse 310 can include a right mouse button and a left mouse button, each of which can generate a triggering event.

The triggering event can cause the processor 300 to alter the manner in which the data is displayed, which portions of the data is actually displayed on the display device 306, and/or provide input to further processing such as selection of a population of interest for particle sorting.

In some embodiments, the processor 300 can be configured to detect when gate selection is initiated by the mouse 310. The processor 300 can be further configured to automatically modify plot visualization to facilitate the gating process. The modification can be based on the specific distribution of biological event data received by the processor 300.

The processor 300 can be connected to a storage device 304. The storage device 304 can be configured to receive and store biological event data from the processor 300. The storage device 304 can be further configured to allow retrieval of biological event data, such as flow cytometric event data, by the processor 300.

A display device 306 can be configured to receive display data from the processor 300. The display data can comprise plots of biological event data and gates outlining sections of the plots. The display device 306 can be further configured to alter the information presented according to input received from the processor 300 in conjunction with input from the apparatus 302, the storage device 304, the keyboard 308, and/or the mouse 310.

In some implementations the processor 300 can generate a user interface to receive example events for sorting. For example, the user interface can include a control for receiving example events or example images. The example events or images or an example gate can be provided prior to collection of event data for a sample or based on an initial set of events for a portion of the sample.

Figure 4:
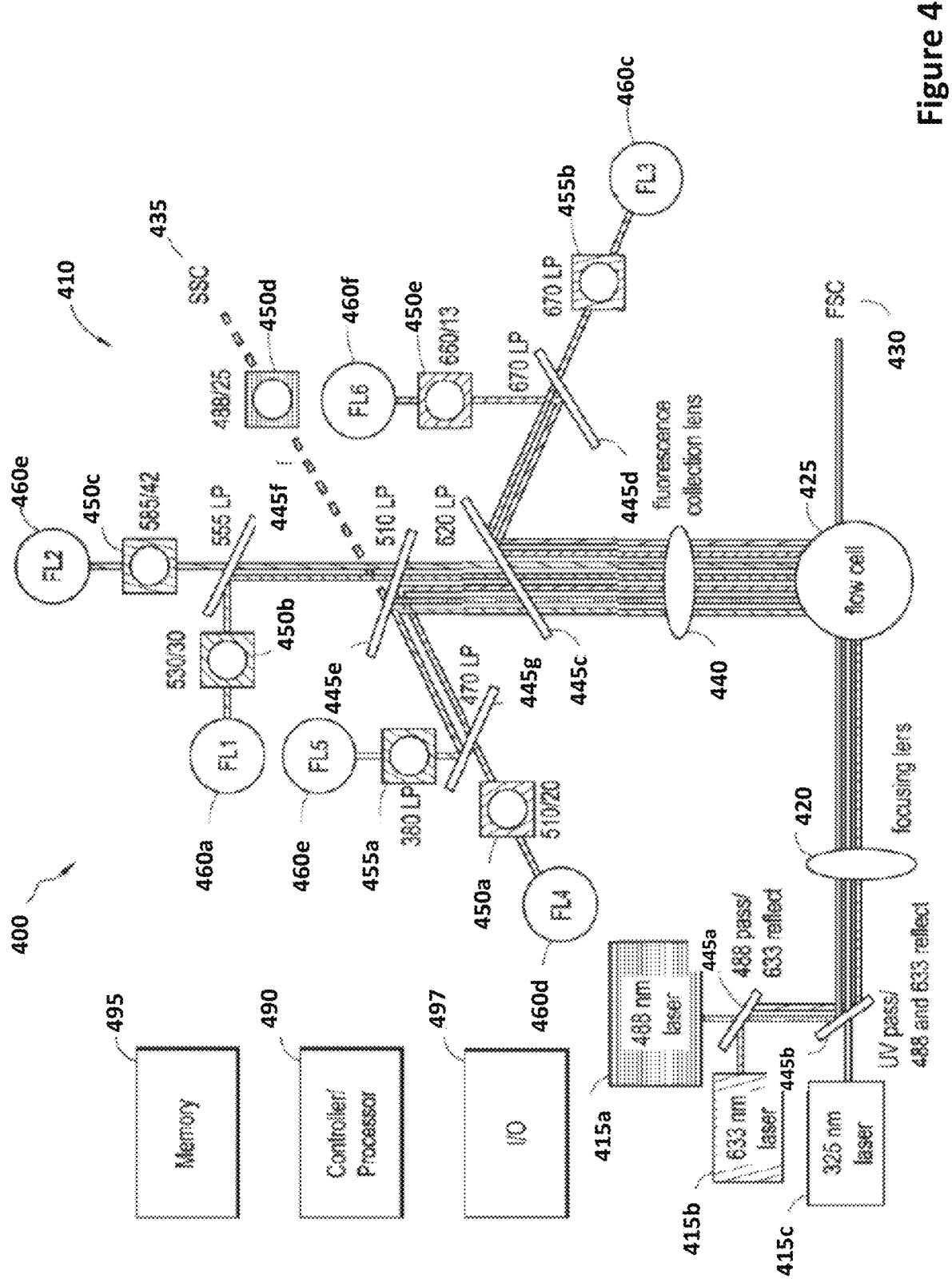
FIG. 4 depicts a flow cytometer according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 shortpass beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 490 comprises at least one general purpose processor as well as a plurality of parallel processing units and is coupled to the detectors to receive the output signals therefrom and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data, including one or more histograms of cytometric data, to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
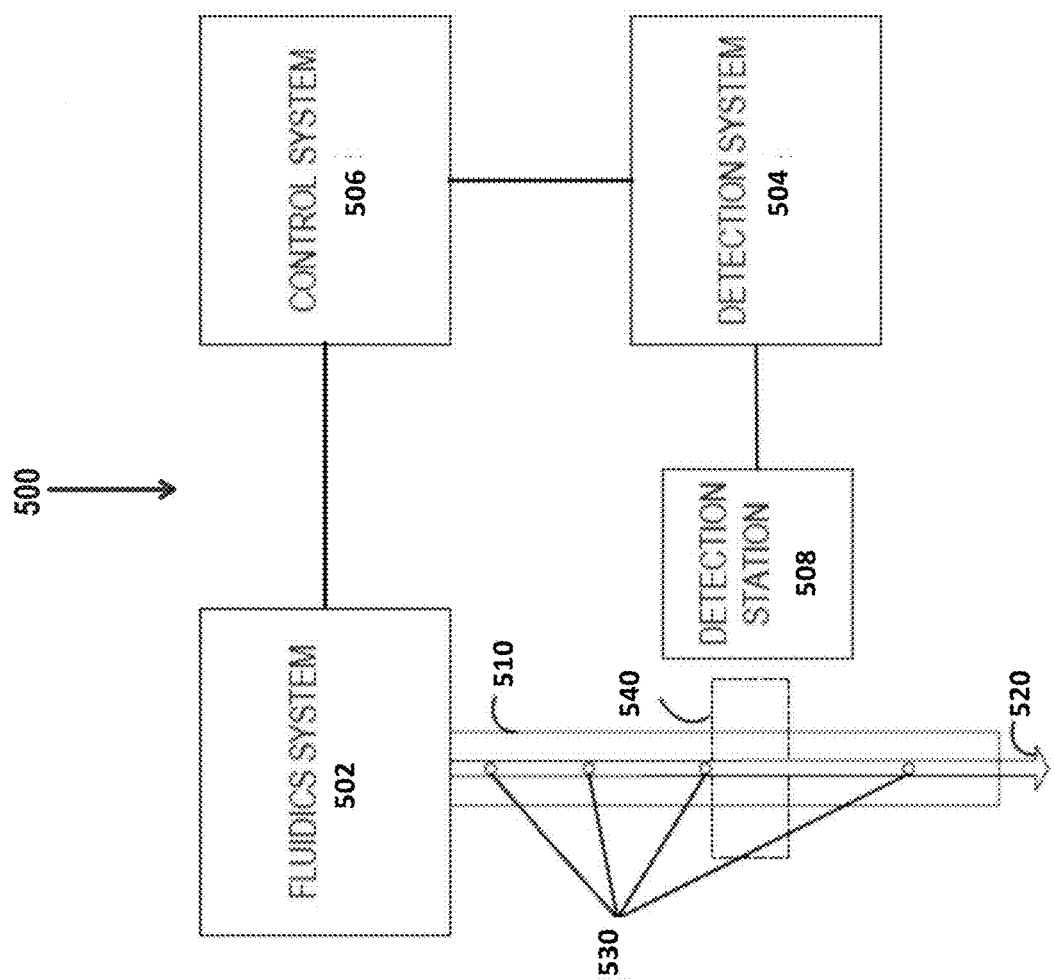
FIG. 5 depicts a functional block diagram of a particle analysis system for sample analysis and particle characterization according to certain embodiments.

FIG. 5 shows a functional block diagram of a particle analysis system for computational based sample analysis and particle characterization. In some embodiments, the particle analysis system 500 is a flow system. The particle analysis system 500 shown in FIG. 5 can be configured to perform aspects of the methods described herein. The particle analysis system 500 includes a fluidics system 502. The fluidics system 502 can include or be coupled with a sample tube 510 and a moving fluid column within the sample tube in which particles 530 (e.g., cells) of a sample move along a common sample path 520.

The particle analysis system 500 includes a detection system 504 configured to collect a signal from each particle as it passes one or more detection stations along the common sample path. A detection station 508 generally refers to a monitored area 540 of the common sample path. Detection can, in some implementations, include detecting light or one or more other properties of the particles 530 as they pass through a monitored area 540. In FIG. 5, one detection station 508 with one monitored area 540 is shown. Some implementations of the particle analysis system 500 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 504 is configured to collect a succession of such data points in a first time interval.

Figure 6A:
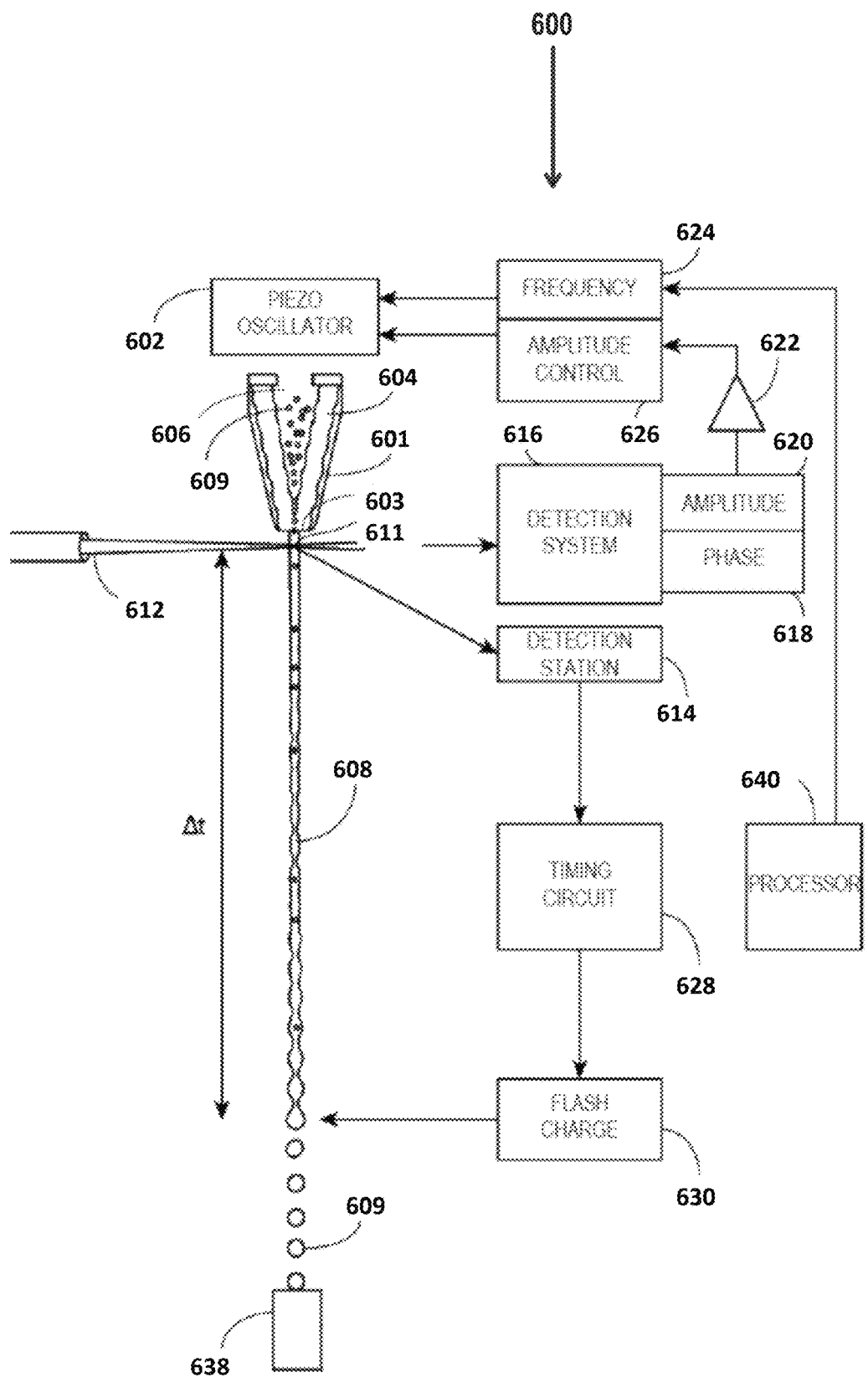
FIG. 6A depicts a schematic drawing of a particle analyzer and sorter system according to certain embodiments.

The particle analysis system 500 can also include a control system 506. The control system 506 can include one or more general purpose processors, a plurality of parallel processing units, an amplitude control circuit 626 and/or a frequency control circuit 624 as shown in FIG. 6A and discussed below. The control system 506 shown can be operationally associated with the fluidics system 502. The control system 506 can be configured to generate a calculated signal frequency for at least a portion of the first time interval based on a Poisson distribution and the number of data points collected by the detection system 504 during the first time interval. The control system 506 can be further configured to generate an experimental signal frequency based on the number of data points in the portion of the first time interval. The control system 506 can additionally compare the experimental signal frequency with that of a calculated signal frequency or a predetermined signal frequency. In addition, the control system 506 can be configured to generate a representation of a histogram of cytometric data by encoding the histogram. The control system 506 can generate a representation of a histogram by assigning a color to each histogram value substantially concurrently using the plurality of parallel processing units and subsequently duplicating the encodings of colors corresponding to histogram values, for example using the general purpose processor.

FIG. 6A is a schematic drawing of a particle analyzer and sorter system 600 (e.g., the particle analyzer 302 as shown in FIG. 3) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g., a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay ($\Delta t$), a flash charge can be applied to the moving fluid column 608 such that a drop of interest carries a charge. The drop of interest can include one or more particles or cells to be sorted. The charged drop can then be sorted by activating deflection plates (not shown) to deflect the drop into partitions, for example, a vessel such as a collection tube or a multi-well or microwell sample plate where a partition or a well or a microwell can be associated with drops of particular interest. As shown in FIG. 6A, the drops can be collected in a drain receptacle 638.

A detection system 616 (e.g., a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
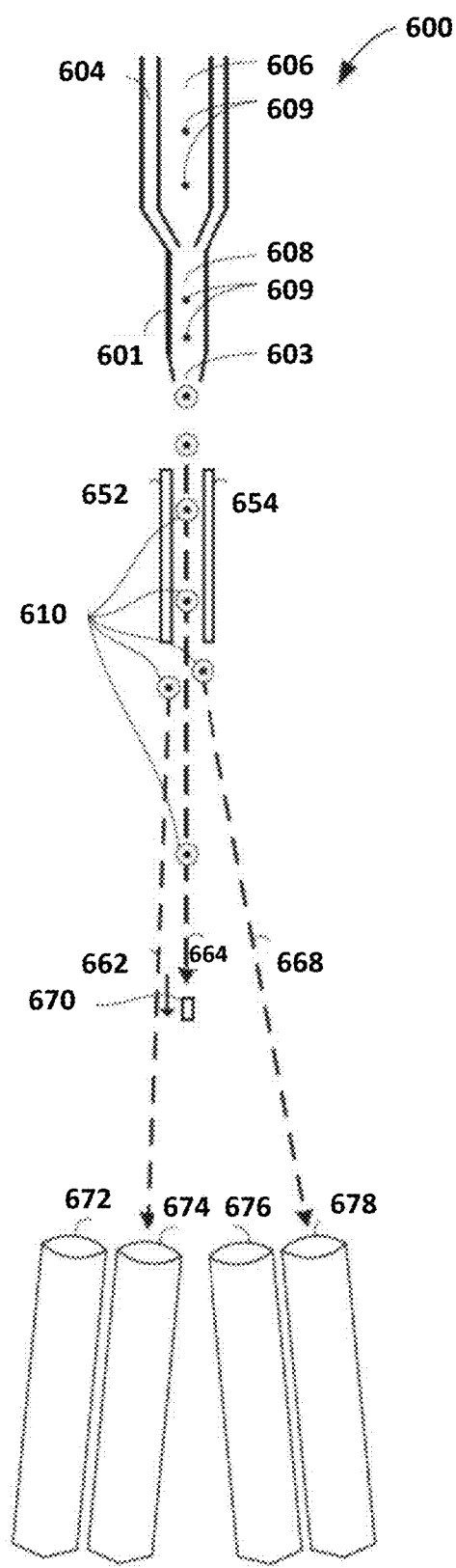
FIG. 6B depicts a schematic drawing of a particle analyzer and sorter system according to certain embodiments.

FIG. 6B is a schematic drawing of a particle analyzer and sorter system, in accordance with one embodiment presented herein. The particle analyzer and sorter system 600 shown in FIG. 6B includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678), such as a partition. As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

In some embodiments, one or more components described for the particle analyzer and sorter system 600 can be used to analyze and characterize particles, with or without physically sorting the particles into collection vessels. Likewise, one or more components described above for the particle analysis system 500 (FIG. 5) can be used to analyze and characterize particles, with or without physically sorting the particles into collection vessels. For example, particles can be grouped or displayed in a tree that includes at least three groups as described herein or alternatively, could be displayed in one or more histogram formats, using one or more of the components of the particle sorter system 600 or particle analysis system 500.

Systems according to some embodiments, may include a display and operator input device. Operator input devices may, for example, be a keyboard, mouse, or the like. The processing module includes at least one general purpose processor as well as a plurality of parallel processing units, all of which have access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The general purpose processor as well as each of the parallel processing units may be a commercially available processor, or it may be one of other processors that are or will become available. The processors execute the operating system, and the operating system interfaces with firmware and hardware in a well-known manner and facilitates the processors in coordinating and executing the functions of various computer programs that may be written in a variety of programming languages, such as Java, Perl, Python, R, Go, JavaScript, .NET, CUDA, Verilog, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processors may be any suitable analog or digital systems. In some embodiments, the one or more general purpose processors as well as the parallel processing units include analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disc drive, a tape drive, a removable hard disk drive, or a diskette drive. Such types of memory storage devices typically read from, and/or write to, a program storage medium (not shown) such as, respectively, a compact disc, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor of the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the one or more general purpose processors as well as the plurality of parallel processing units, such as a graphics processor, can store and retrieve data, such as magnetic, optical, or solid-state storage devices (including magnetic or optical disks or tape or RAM, or any other suitable device, either fixed or portable). The general purpose processor may include a general-purpose digital microprocessor suitably programmed from a computer readable medium carrying necessary program code. The parallel processing units may include one or more graphics processors suitably programmed from a computer readable medium carrying necessary program code. Programming can be provided remotely to the processors through one or more communication channels, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The one or more general purpose processors may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via a system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located, or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Oracle Solaris, Linux, OS/400, Compaq Tru64 Unix, SGI IRIX, Siemens Reliant Unix, Ubuntu, Zorin OS and others.

Figure 7:
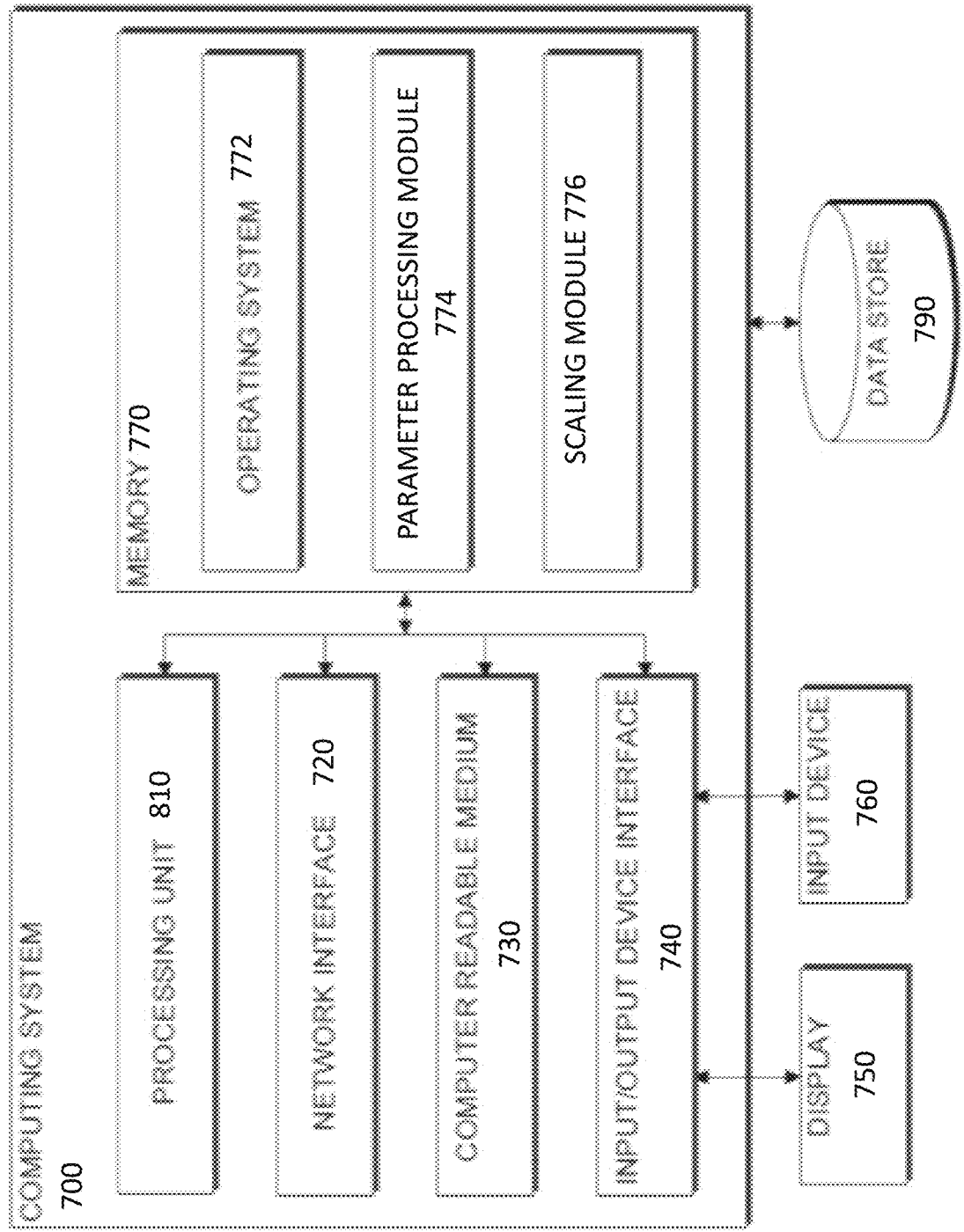
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by processing unit 710 in the general administration and operation of the computing device 700. The memory 770 may further include computer program instructions and other information for implementing aspects of the present disclosure.

For example, in one embodiment, the memory 770 includes a parameter processing module 774 for identifying a parameter of interest and/or specifying positive and negative measurement intervals on the parameter of interest and a scaling module 776 for scaling the cytometric data by transforming the parameter of interest based at least in part on the corresponding specified positive and negative intervals.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5): 502-11; Alison, et al. *J Pathol*, 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ 06 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

Computer-Readable Storage Medium for Scaling Cytometric Data

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming," where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on a computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having: algorithm for obtaining cytometric data comprising measurements of a plurality of parameters from particles irradiated in the sample flowing in a flow stream; algorithm for identifying a parameter of interest; algorithm for specifying positive and negative measurement intervals on the parameter of interest; and algorithm for scaling the cytometric data by transforming the parameter of interest based at least in part on the corresponding specified positive and negative intervals.

In embodiments, computer readable storage media of interest may be configured such that algorithm for obtaining cytometric data comprises receiving an input identifying the parameter of interest. In other embodiments, computer readable storage media of interest may be configured such that algorithm for specifying positive and negative measurement intervals on the parameter of interest comprises receiving as input at least one of the positive and negative measurement intervals on the parameter of interest.

In embodiments, computer readable storage media of interest may be configured such that algorithm for scaling the cytometric data by transforming the parameter of interest comprises rescaling the specified negative measurement interval for the parameter of interest. In some embodiments, rescaling the specified negative measurement interval for the parameter of interest comprises reducing the standard deviation of the specified negative measurement interval for the parameter of interest. In other embodiments, algorithm for scaling the cytometric data by transforming the parameter of interest comprises rescaling the specified positive measurement interval for the parameter of interest. In some cases, rescaling the specified positive measurement interval comprises rescaling the positive measurement interval to a predetermined size. In other cases, the predetermined size is the size of the negative measurement interval. In still other cases, the predetermined size is the size of a scaled positive measurement interval corresponding to a second parameter of the plurality of parameters.

In embodiments, computer readable storage media of interest may be configured such that algorithm for scaling the cytometric data by transforming the parameter of interest comprises adaptively scaling the parameter of interest according to:

$$s(x) = \frac{g(z(x))}{g(z(p))}(1 + (c-1)\Phi_{z(n^+),1}(z(x))),$$

where s(x) represents the adaptively scaled measurements of the parameter of interest; x represents unscaled measurements of the parameter of interest; (n⁻, n⁺) is the specified negative measurement interval of the parameter; (n⁺, p) is the specified positive measurement interval of the parameter; c is a compression factor; $\overline{X}$ is the median of the negative measurement interval; SD is the standard deviation of the negative measurement interval and is calculated according to $$SD = \frac{IQR}{1.36},$$

where IQR is the interquartile range of the negative measurement interval; z(x) is a z-transform according to:

$$z(x) = \frac{x - \overline{X}}{SD};$$

g(z) is an inverse hyperbolic sine function according to: $g(z)=\ln(z+\sqrt{z^2+1})$; and $\Phi_{z(n^+),1}$ is a cumulative distribution function of standard normal distribution with μ=z(n⁺) and σ=1. In embodiments, a default value for the compression factor, c, is 70.

In embodiments, computer readable storage media of interest may further comprise algorithm for causing the scaled cytometric data to be displayed on a display device. In such embodiments, computer readable storage media of interest may be configured such that algorithm for causing the scaled cytometric data to be displayed on a display device comprises causing a plot of cytometric data comprising the transformed parameter of interest to be displayed.

In certain embodiments, algorithm for specifying positive and negative measurement intervals on the parameter of interest comprises using one-dimensional gating to specify at least one of the positive and negative measurement intervals on the parameter of interest. In other embodiments, algorithm for specifying positive and negative measurement intervals on the parameter of interest comprises receiving as input one-dimensional gates specifying the positive and negative measurement intervals on the parameter of interest. In still other embodiments, algorithm for specifying positive and negative measurement intervals on the parameter of interest comprises applying a fluorescence minus one control to specify at least one of the positive and negative measurement intervals on the parameter of interest. In still other embodiments, algorithm for specifying positive and negative measurement intervals on the parameter of interest comprises applying a mathematical model to specify at least one of the positive and negative measurement intervals on the parameter of interest. In still other embodiments, algorithm for specifying positive and negative measurement intervals on the parameter of interest comprises applying a machine learning algorithm to specify one or both of the positive and negative measurement intervals on the parameter of interest.

In some cases, computer readable storage media of interest may be configured such that the instructions further comprise: algorithm for identifying one or more additional parameters of interest; algorithm for specifying positive and negative measurement intervals on each additional parameter of interest; and algorithm for scaling the cytometric data by transforming each additional parameter of interest based at least in part on the corresponding specified positive and negative intervals.

In some cases, computer readable storage media of interest may be configured such that the instructions further comprise: algorithm for clustering the cytometric data by applying a clustering algorithm to the scaled cytometric data. In certain cases, algorithm for causing the scaled cytometric data to be displayed on a display device comprises causing the display of the clusters of the scaled cytometric data.

In embodiments of subject non-transitory computer readable storage media, the cytometric data is high dimensionality data. In some cases, the plurality of measurement parameters ranges from two to about 300,000 measurement parameters.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Utility

The subject systems, methods and computer systems find use in a variety of applications where it is desirable to identify and analyze and in some cases sort particle components, such as cells, in a sample in a fluid medium, such as a biological sample. In some embodiments, the systems and methods described herein find use in flow cytometry characterization of biological samples labeled with fluorescent tags. In other embodiments, the systems and methods find use in spectroscopy of emitted light. In addition, the subject systems and methods find use in analyzing a sample, such as by reducing the effect of noise on the data collected or improving the effectiveness of clustering algorithms. As a result, in some cases, the subject systems and methods may find use in distinguishing different particle types in a sample, such as different cell types in a biological sample. In addition, the subject systems and methods find use in improving the efficiency and effectiveness of sorting a sample (e.g., in a flow stream). By improving the efficiency of sorting a sample, it is meant that fewer particles, such as cells, of a sample may be mischaracterized or misunderstood, due to, for example, measurement noise that is indistinguishable from signal, when sorting or analyzing a sample when the subject systems and methods are employed. In particular, the subject systems and methods may improve efficiency and effectiveness of analyzing or sorting when high dimensionality data is collected and analyzed. Embodiments of the present disclosure find use where it is desirable to provide a flow cytometer with improved cell sorting efficiency, enhanced particle collection, particle charging efficiency or more accurate particle charging during cell sorting.

Embodiments of the present disclosure also find use in applications where cells prepared from a biological sample may be desired for research, laboratory testing or for use in therapy. In some embodiments, the subject methods and devices may facilitate identifying and/or obtaining individual cells or populations thereof prepared from a target fluidic or tissue biological sample. For example, the subject methods and systems facilitate identifying and/or obtaining cells from fluidic or tissue samples to be used as a research or diagnostic specimen for diseases such as cancer. Likewise, the subject methods and systems may facilitate identifying and/or obtaining cells from fluidic or tissue samples to be used in therapy. Methods and devices of the present disclosure allow for analyzing and/or separating and collecting cells from a biological sample (e.g., organ, tissue, tissue fragment, fluid) with enhanced effectiveness and efficiency and low cost as compared to traditional flow cytometry systems, in particular when high dimensionality data is collected and/or analyzed.

The following is offered by way of illustration and not by way of limitation.

EXPERIMENTAL

Figure 8:
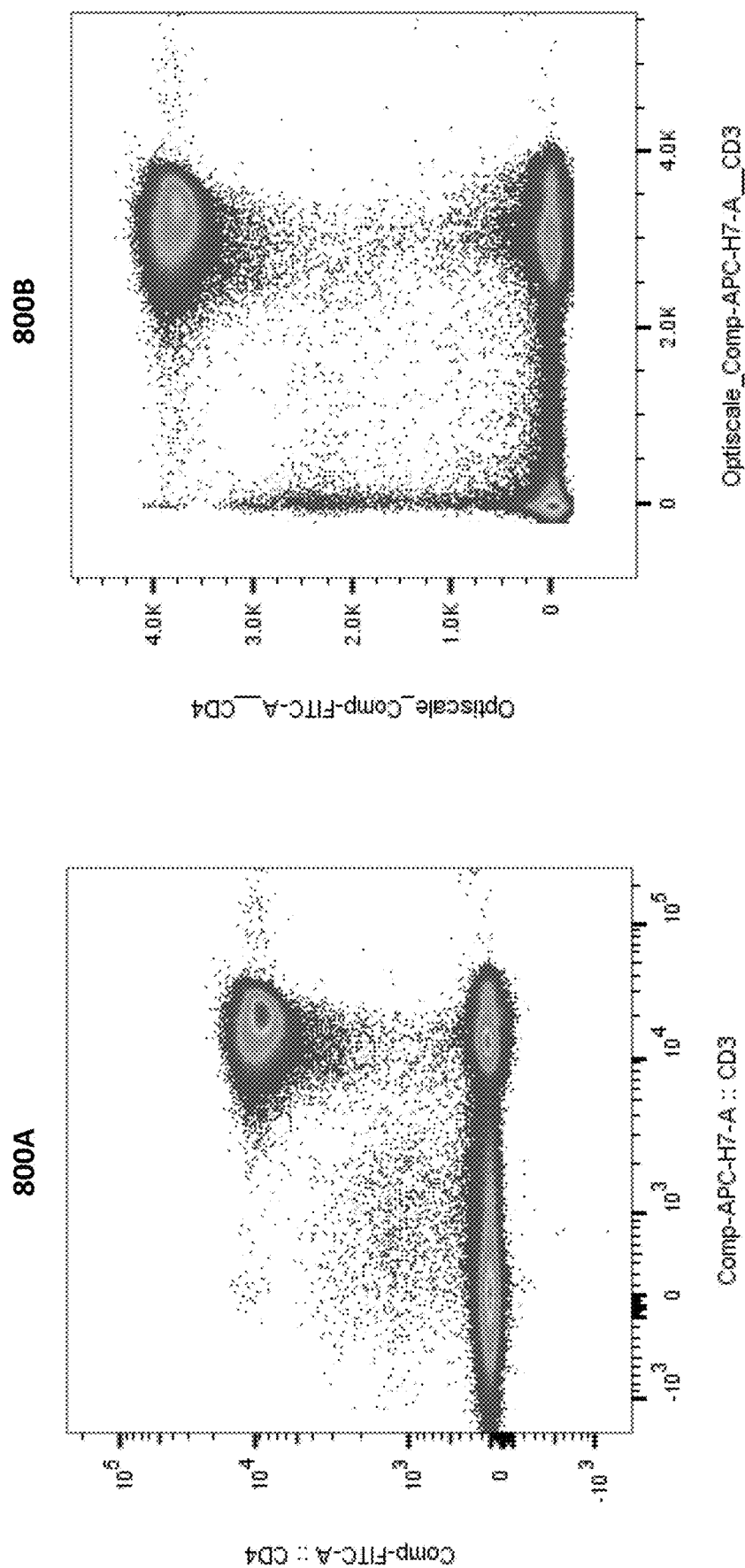
FIG. 8 depicts two-dimensional plots showing two parameters of cytometric data scaled according to a default scaling approach and scaled according to embodiments of the present invention.

FIG. 8 depicts two-dimensional plot 800A showing two parameters of cytometric data that has been scaled according to a default scaling approach. In contrast, plot 800B shows the same two parameters but this time scaled according to the subject methods. That is, the only difference between the representations of the data in plot 800A and 800B is how the data comprising the two parameters are scaled.

Figure 9:
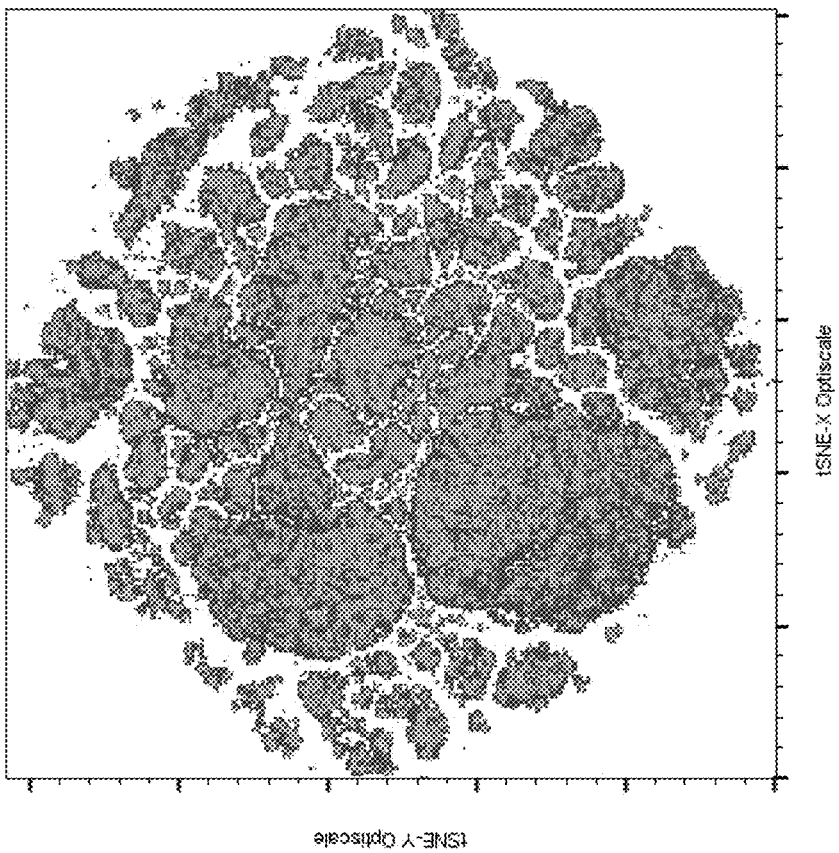
FIG. 9 depicts two-dimensional plots showing two parameters of cytometric data scaled according to a default scaling approach and scaled according to embodiments of the present invention.
Figure 9:
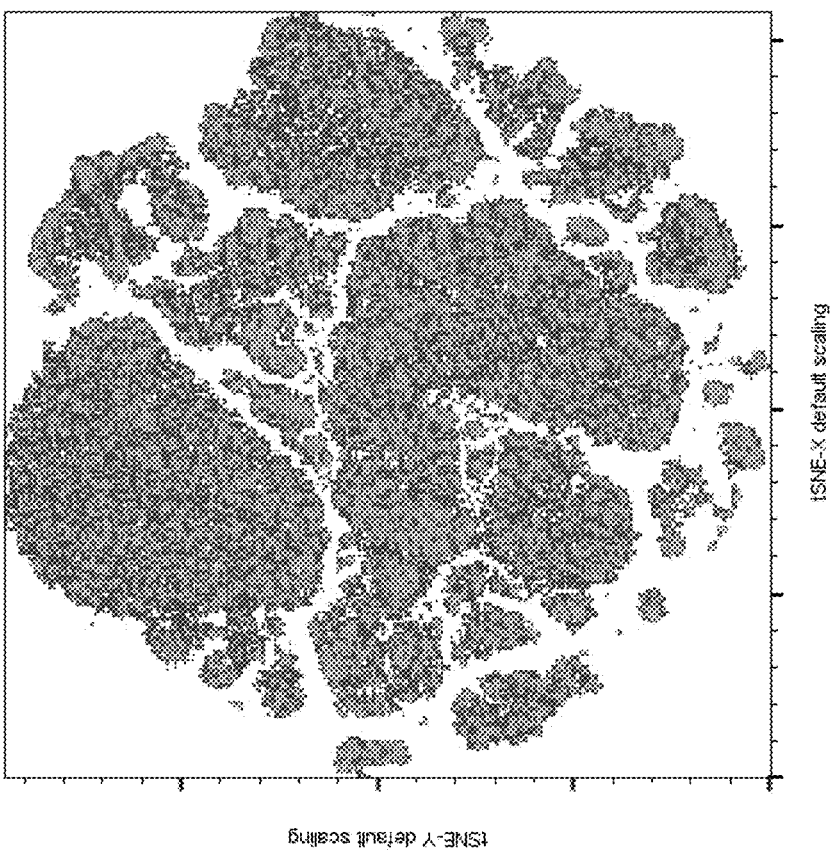

FIG. 9 depicts a two-dimensional plot 900A produced based on 1,000 iterations of the opt-SNE algorithm, as implemented in FlowJo 10.7, applied to 12-parameter PBMC (peripheral blood mononuclear cells) cytometric data that has been scaled according to a default scaling approach, also implemented in FlowJo 10.7 software. As the underlying data represents measurements of PBMCs, the color code in plots 900A and 900B represents local cell density, with darker/bluer shades representing areas of lower cell density and greener/lighter shades representing areas of higher cell density. In contrast, plot 900B shows the same cytometric data but this time scaled according to the subject methods. Upon visual inspection of plot 900B of the data scaled according to the subject methods, as compared with plot 900A, it is evident that the opt-SNE algorithm identifies more well-defined groupings, i.e., clusters, with a finer structure to the data.

Figure 10:
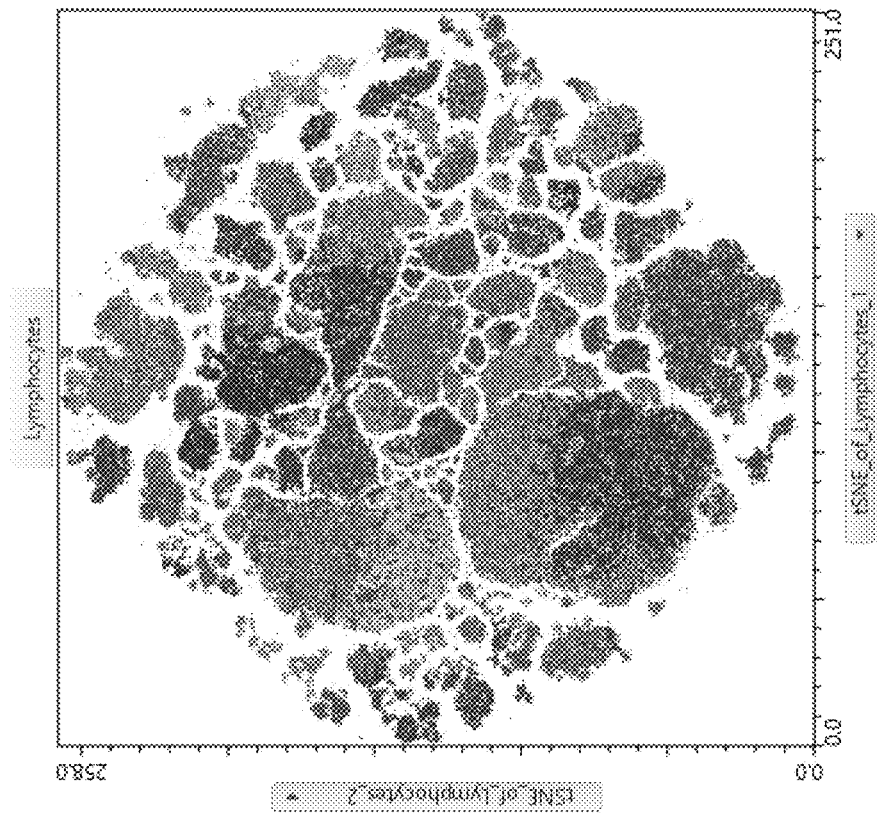
FIG. 10 depicts two-dimensional plots showing two parameters of cytometric data scaled according to a default scaling approach and scaled according to embodiments of the present invention as well as the results of applying clustering algorithm to scaled cytometric data.
Figure 10:
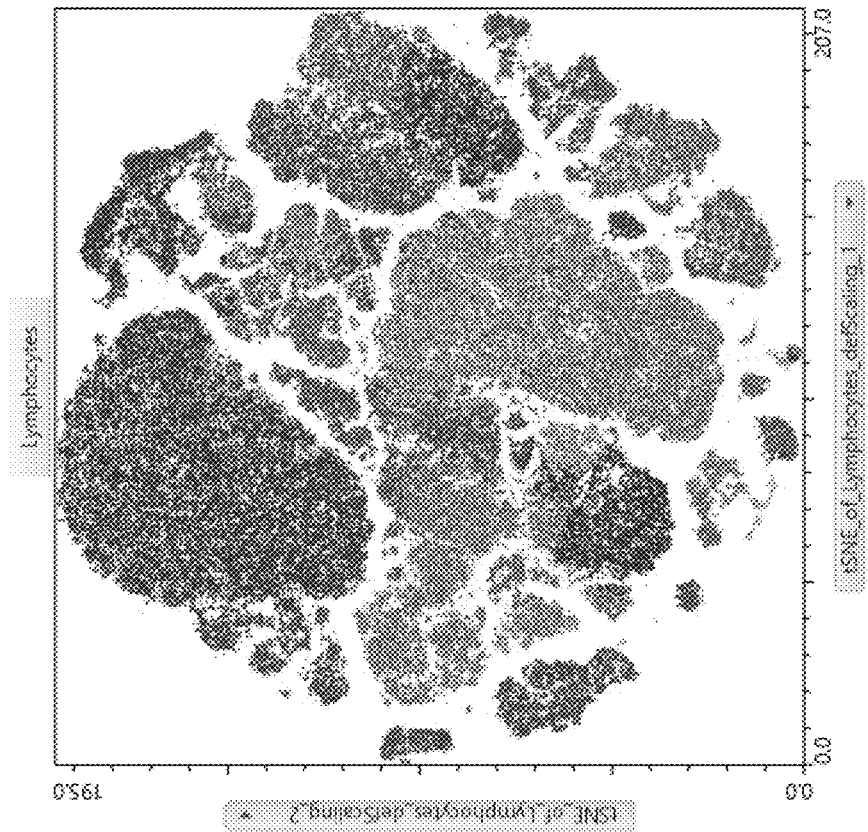

FIG. 10 shows the same opt-SNE plots seen in FIGS. 91000A and 1000B, corresponding to 900A and 900B, respectively, of the same cytometric data but with cells colored or shaded according to cluster identity. Clusters were identified by the X-shift clustering algorithm. Application of the X-shift clustering algorithm identified 82 clusters in the dataset scaled according to the subject methods, compared to 34 clusters identified in the dataset scaled according to the default (state-of-the-art) scaling method. Thus, scaling the cytometric data according to the subject methods results in both X-shift and opt-SNE algorithms detecting a much larger number of populations. These findings demonstrate that the subject scaling methods results in an unexpected and dramatic improvement in sensitivity of population identification by multidimensional analysis algorithms, such as opt-SNE and X-shift. That is, scaling the data according to the subject methods unexpectedly caused the same clustering algorithm to identify significantly more clusters in the same cytometric data, i.e., the same sample and data collection techniques.

In each of FIG. 8, FIG. 9 and FIG. 10, the cytometric data presented is a 12-color PBMC dataset collected on FACS-Lyric cytometer instrument, and subject to spillover compensation according to the standard operating procedure.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A computer-implemented method of displaying clustered cytometric data, the method comprising:
    obtaining cytometric data for a sample, wherein the cytometric data comprises measurements of a plurality of parameters from particles irradiated in the sample flowing in a flow stream;
    clustering the cytometric data;
    displaying the clustered cytometric data;
    receiving a selection of a parameter of interest of a plurality of parameters of the cytometric data;
    displaying the parameter of interest;
    receiving a positive measurement interval and a negative measurement interval of the displayed parameter of interest;
    transforming the parameter of interest of the cytometric data based at least in part on the positive and negative measurement intervals, wherein transforming the parameter of interest comprises rescaling the positive and negative measurement intervals for the parameter of interest;
    clustering the transformed cytometric data; and
    automatically updating the display of the clustered cytometric data to reflect the transformed cytometric data.

2. The method according to claim 1, wherein rescaling the specified negative measurement interval for the parameter of interest comprises reducing the standard deviation of the specified negative measurement interval for the parameter of interest.

3. The method according to claim 1, wherein rescaling the specified positive measurement interval comprises rescaling the positive measurement interval to a predetermined size.

4. The method according to claim 1, wherein transforming the parameter of interest comprises adaptively scaling the parameter of interest according to:

$$s(x) = \frac{g(z(x))}{g(z(p))}(1 + (c-1)\Phi_{z(n^+),1}(z(x)))$$

where,
    s(x) represents the adaptively scaled measurements of the parameter of interest;
    x represents unscaled measurements of the parameter of interest;
    $(n^-, n^+)$ is the specified negative measurement interval of the parameter of interest;
    $(n^+, p)$ is the specified positive measurement interval of the parameter of interest;
    c is a compression factor;
    $\overline{X}$ is the median of the negative measurement interval;
    SD is the standard deviation of the negative measurement interval and is calculated according to $$SD_x = \frac{IQR}{1.36},$$

where IQR is the interquartile range of the negative measurement interval;
    z(x) is a z-transform according to:

$$z(x) = \frac{x - \overline{X}}{SD};$$

g(z) is a inverse hyperbolic sine function according to:
    $g(z)=\ln(z+\sqrt{z^2+1})$; and
    $\Phi_{z(n^+),1}$ is a cumulative distribution function of standard normal distribution with $\mu=z(n^+)$ and $\sigma=1$.

5. The method according to claim 1, wherein updating the display of the clustered cytometric data comprises displaying a plot of cytometric data comprising the transformed parameter of interest.

6. The method according to claim 1, wherein specifying at least one of the positive and negative measurement intervals on the parameter of interest comprises performing one-dimensional gating to specify the intervals.

7. The method according to claim 1, wherein specifying at least one of the positive and negative measurement intervals on the parameter of interest comprises applying a fluorescence minus one control to specify the intervals.

8. The method according to claim 1, wherein specifying at least one of the positive and negative measurement intervals on the parameter of interest comprises applying a mathematical model to specify the intervals.

9. The method according to claim 1, wherein specifying one or both of the positive and negative measurement intervals on the parameter of interest comprises applying a machine learning algorithm to specify the intervals.

10. The method according to claim 1, further comprising:
    identifying one or more additional parameters of interest;
    specifying positive and negative measurement intervals on each additional parameter of interest; and
    scaling the cytometric data by transforming each additional parameter of interest based at least in part on the corresponding specified positive and negative intervals.

11. The method according to claim 10, wherein the specified positive measurement interval for each parameter of interest is rescaled to the same predetermined size.

12. The method according to claim 1, wherein the plurality of measurement parameters ranges from two to about 300,000 measurement parameters.

13. The method according to claim 1, wherein the cytometric data comprises light measurements from the particles irradiated in the sample.

14. The method according to claim 1, wherein obtaining cytometric data for a sample comprises obtaining measurements from flow cytometrically analyzing the sample.

* * * * *